US008602182B2

(12) United States Patent
St. Clair et al.

(10) Patent No.: US 8,602,182 B2
(45) Date of Patent: Dec. 10, 2013

(54) CONTROLLABLE VEHICLE SUSPENSION SYSTEM WITH A CONTROLLABLE MAGNETORHEOLOGICAL FLUID STRUT

(75) Inventors: Kenneth Alan St. Clair, Cary, NC (US); William J. McMahon, Chapel Hill, NC (US); Robert Marjoram, Holly Springs, NC (US); Mark R. Jolly, Raleigh, NC (US); J. David Carlson, Cary, NC (US); K. Andrew Kintz, Apex, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 12/946,094

(22) Filed: Nov. 15, 2010

(65) Prior Publication Data
US 2011/0056780 A1 Mar. 10, 2011

Related U.S. Application Data

(63) Continuation of application No. 11/742,911, filed on May 1, 2007, now Pat. No. 7,849,983.

(60) Provisional application No. 60/796,567, filed on May 1, 2006.

(51) Int. Cl.
*F16F 9/53* (2006.01)
(52) U.S. Cl.
USPC .......................................... 188/267.2
(58) Field of Classification Search
USPC .............. 188/266, 267, 267.1, 267.2
See application file for complete search history.

(56) References Cited

U.S. PATENT DOCUMENTS

| 2,850,276 | A | | 9/1958 | Jackson |
| 4,079,925 | A | | 3/1978 | Salin |
| 4,790,522 | A | | 12/1988 | Drutchas |
| 5,277,281 | A | * | 1/1994 | Carlson et al. ................ 188/267 |
| 5,458,217 | A | | 10/1995 | Ohishi |

(Continued)

FOREIGN PATENT DOCUMENTS

| DE | 2642932 A1 | 3/1978 |
| DE | 4244204 A1 | 6/1994 |

(Continued)

OTHER PUBLICATIONS

J. David Carlson and B.F. Spencer, Jr., Magnetorheological Fluid Dampers for Seismic Control, Proceedings of DETC 97, ASME Design Engineering Technical Conferences, 1997, 6 pages.

(Continued)

*Primary Examiner* — Melanie Torres Williams
(74) *Attorney, Agent, or Firm* — Edward F. Murphy, III; Richard G. Miller

(57) ABSTRACT

The controllable suspension system includes a strut with a magnetorheological fluid damper. The magnetorheological fluid damper includes a longitudinal damper tubular housing having a longitudinally extending axis and an inner wall for containing magnetorheological fluid. The damper includes a piston head movable within the damper tubular housing along a longitudinal length the housing, with the damper piston head providing a first upper variable volume magnetorheological fluid chamber and a second lower variable volume magnetorheological fluid chamber, with a fluid flow gap between the upper and lower fluid chambers, the damper piston having a longitudinal piston rod for supporting the piston head within the housing, with the piston supported within the housing with a piston rod bearing assembly disposed between the housing and the rod, with the piston rod bearing assembly having a piston rod bearing seal interface.

21 Claims, 24 Drawing Sheets

(56) References Cited

U.S. PATENT DOCUMENTS

| | | | |
|---|---|---|---|
| 5,549,837 A | 8/1996 | Ginder et al. | |
| 5,878,851 A | 3/1999 | Carlson | |
| 6,070,681 A | 6/2000 | Catanzarite et al. | |
| 6,311,810 B1 | 11/2001 | Hopkins | |
| 6,318,526 B1 | 11/2001 | Kruckemeyer et al. | |
| 6,336,535 B1 | 1/2002 | Lisenker | |
| 6,382,369 B1 | 5/2002 | Lisenker | |
| 6,419,057 B1 | 7/2002 | Oliver et al. | |
| 6,481,546 B2 | 11/2002 | Oliver et al. | |
| 6,860,371 B2 | 3/2005 | Ananthanarayanan et al. | |
| 6,953,108 B2 | 10/2005 | Anderfaas et al. | |
| 6,953,109 B2 | 10/2005 | Watson et al. | |
| 7,011,193 B2 | 3/2006 | Lemmens et al. | |
| 7,413,063 B1 | 8/2008 | Davis | |
| 2002/0130001 A1* | 9/2002 | Lisenker | 188/267.2 |
| 2003/0029683 A1 | 2/2003 | Oliver | |
| 2003/0070892 A1 | 4/2003 | Iyengar et al. | |
| 2003/0094341 A1 | 5/2003 | Lemieux | |
| 2004/0104061 A1 | 6/2004 | Oliver et al. | |
| 2004/0154524 A1 | 8/2004 | Fedders | |
| 2004/0182661 A1 | 9/2004 | Lun | |
| 2004/0195062 A1 | 10/2004 | Anderfaas et al. | |
| 2005/0148420 A1 | 7/2005 | Murao | |
| 2006/0260891 A1 | 11/2006 | Kruckemeyer et al. | |

FOREIGN PATENT DOCUMENTS

| | | |
|---|---|---|
| EP | 0150104 A2 | 7/1985 |
| EP | 1013963 A | 6/2000 |
| EP | 1013963 A2 | 6/2000 |
| EP | 1355083 A2 | 10/2003 |
| EP | 1661796 A2 | 5/2006 |
| FR | 1094516 A | 5/1955 |
| FR | 1414941 A | 9/1965 |
| FR | 1414841 A | 10/1965 |
| FR | 2579283 A | 9/1986 |
| JP | 07-004944 A | 10/1995 |
| WO | 94/00704 A | 1/1994 |
| WO | 98/56642 A | 12/1998 |
| WO | 2008/136851 A2 | 11/2008 |

OTHER PUBLICATIONS

J.D. Carlson AD B.F. Spencer, Jr., Magneto-Rheological Fluid Dampers for Semi-Active Seismic Control, Third International Conference on Motion and Vibration Control, 1996, 6 pages.

H. Janocha, Adaptronics and Smart Structures, Basics, Materials, Design, and Applications, Springer-Verlag Berlin Heidelberg 1999, pp. 180-238.

B.F. Spencer, Jr., J. David Carlson, M.K. Sain, G. Yang, On the Current Status of Magnetorheological Dampers: Seismic Protection of Full-Scale Structures, Proceedings of the 1997 American Control Conference, Albuquerque, New Mexico, 5 pages.

J. David Carlson and Billie F. Spencer, Jr., Magneto-Rheological Fluid Dampers: Scalability and Design Issues for Application to Dynamic Hazard Mitigation, pp. 99-109.

AHR International, Glacier Bearings, http://www.ahrinternational.com/glacier_bearings.htm, Oct. 30, 2007, 6 pages.

* cited by examiner

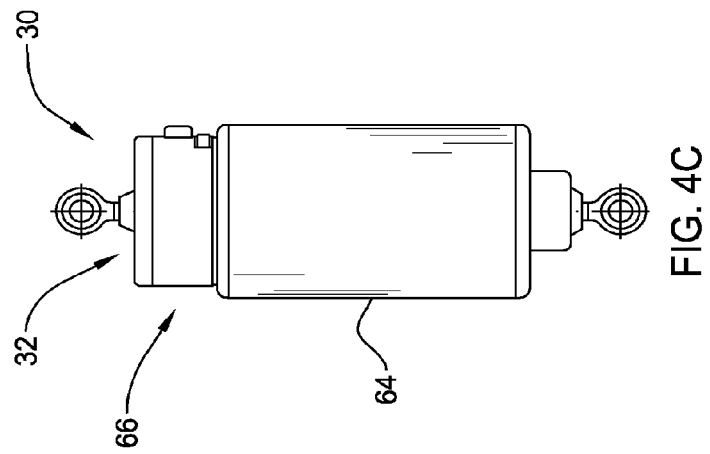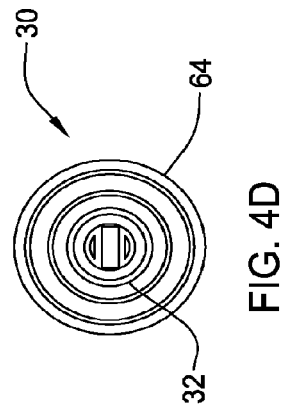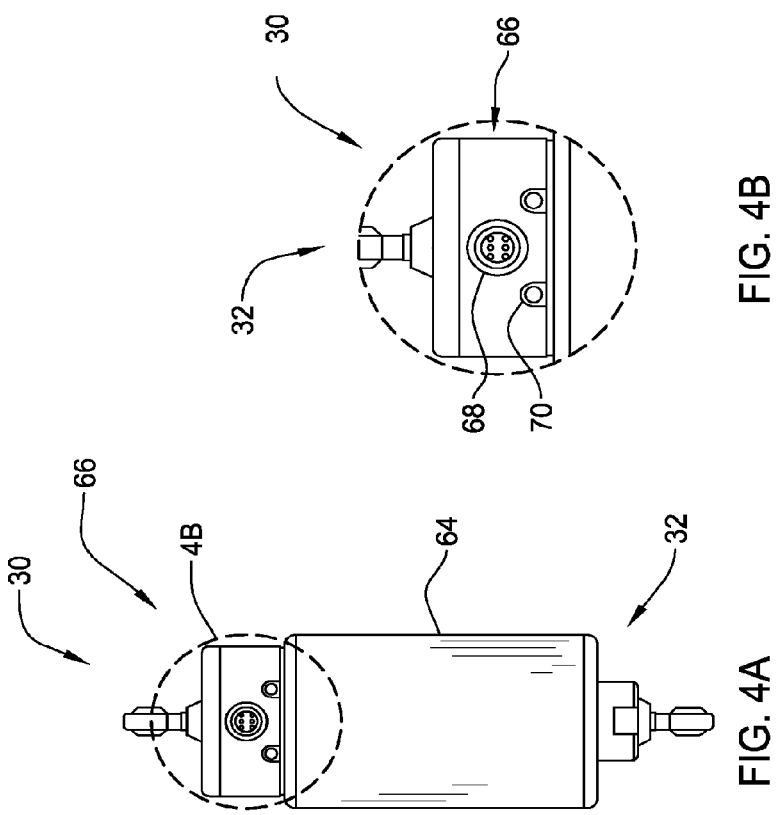

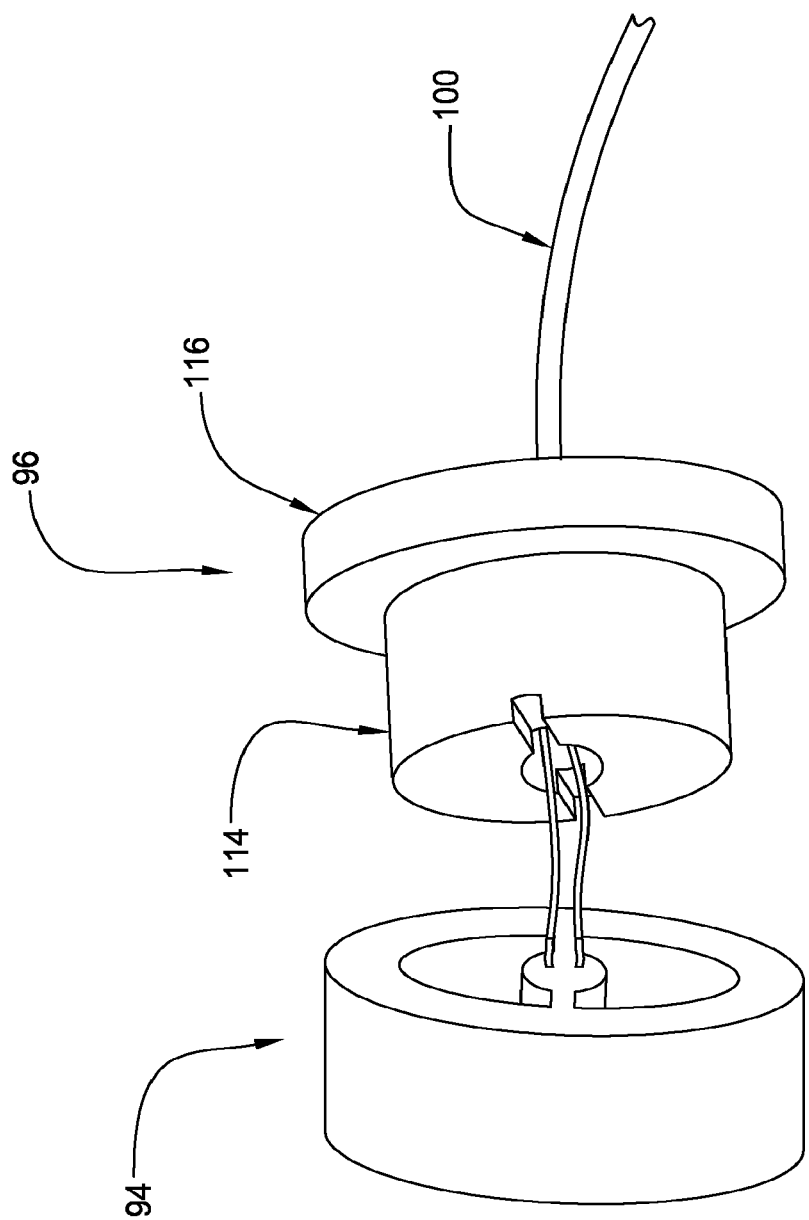

CONTROLLABLE VEHICLE SUSPENSION SYSTEM WITH A CONTROLLABLE MAGNETORHEOLOGICAL FLUID STRUT

CROSS REFERENCE

This application is a continuation of U.S. patent application Ser. No. 11/742,911 filed May 1, 2007 now U.S. Pat. No. 7,849,983, which claims the benefit of U.S. Provisional Patent Application No. 60/796,567 (CONTROLLABLE VEHICLE SUSPENSION SYSTEM WITH A CONTROLLABLE MAGNETORHEOLOGICAL FLUID STRUT) filed May 1, 2006. This application claims the benefit of and incorporates by reference the above filed applications.

FIELD OF THE INVENTION

The invention relates to the field of suspension systems for controlling motion. The invention relates to the field of controllable systems for controlling motion and providing support. More particularly the invention relates to the field of controllable vehicle systems for controlling vehicle motions, and more particularly provides vehicle cab suspensions with controllable magnetorheological fluid struts having beneficial motion control.

BACKGROUND OF THE INVENTION

There is a need for controllable struts for supporting a load while providing motion control and vibration isolation. There is a need for vehicle cab struts for isolating vibrations and controlling cab motions. There is a need for controllable magnetorheological fluid struts which accurately and economically control and minimize vibrations. There is a need for an economically feasible method of making motion control struts and vehicle suspension systems. There is a need for a robust suspension system and struts for isolating troublesome vibrations and controlling vehicle motions. There is a need for an economic suspension system providing beneficial controlled motion and vibration isolation.

SUMMARY OF THE INVENTION

In an embodiment the invention includes a controllable suspension system for controlling the relative motion between a first body and a second body. The controllable suspension system including a strut with a magnetorheological fluid damper. The magnetorheological fluid damper includes a longitudinal damper tubular housing having a longitudinally extending axis, the longitudinal damper tubular housing having an inner wall for containing a magnetorheological fluid within the tubular housing. The magnetorheological fluid damper includes a cantilevered damper piston. The damper piston includes a piston head movable within the damper tubular housing along a longitudinal length of the tubular housing. The damper piston head provides a first upper variable volume magnetorheological fluid chamber and a second lower variable volume magnetorheological fluid chamber, with the damper piston head having a fluid flow gap between the first upper variable volume magnetorheological fluid chamber and the second lower variable volume magnetorheological fluid chamber with a piston head fluid flow interface length HL. The damper piston has a longitudinal piston rod for supporting the piston head within the longitudinal damper tubular housing. The piston is supported within the longitudinal damper tubular housing with a piston rod bearing assembly disposed between the longitudinal damper tubular housing and the longitudinal piston rod, the piston rod bearing assembly having a piston rod bearing seal interface length BL, wherein contact between the piston head and the damper tubular housing inner wall is inhibited.

In an embodiment the invention includes a controllable damper for controlling motion. The controllable damper includes a longitudinal damper tubular housing having a longitudinally extending axis and an inner wall for containing a magnetorheological fluid within the tubular housing. The controllable damper includes a single ended damper piston. The damper piston includes a piston head movable within the damper tubular housing along a longitudinal length of the tubular housing with the damper piston head providing a first upper variable volume magnetorheological fluid chamber and a second lower variable volume magnetorheological fluid chamber, with the damper piston head providing a fluid flow gap between the first upper variable volume fluid chamber and the second lower variable volume fluid chamber with a piston head fluid flow interface length HL. The damper piston has a longitudinal piston rod for supporting the piston head within the longitudinal damper tubular housing. The damper piston is supported within the longitudinal damper tubular housing with an upper piston rod bearing assembly disposed between the longitudinal damper tubular housing and the longitudinal piston rod, with the piston rod bearing assembly having a piston rod bearing seal interface length BL, wherein contact between the piston head and the damper tubular housing inner wall is minimized and inhibited.

In an embodiment the invention includes a method of making a controllable suspension system for controlling the relative motion between a first body and a second body. The method includes providing a longitudinal damper tubular housing having a longitudinally extending axis and an inner wall for containing a magnetorheological fluid within the tubular housing. The longitudinal damper tubular housing has a first upper end and a second distal lower end. The method includes providing a piston rod bearing assembly. The piston rod bearing assembly has a piston rod bearing seal interface length BL for supporting a damper piston within the longitudinal damper tubular housing. The method includes providing a damper piston, the damper piston including a piston head and a longitudinal piston rod for supporting the piston head within the longitudinal damper tubular housing. The method includes disposing the piston rod bearing assembly in the longitudinal damper tubular housing proximate the first upper end. The method includes receiving the damper piston longitudinal piston rod in the piston rod bearing assembly, wherein the piston head is movable within the damper tubular housing along the longitudinal length of the tubular housing. The damper piston head provides a first upper variable volume magnetorheological fluid chamber and a second lower variable volume magnetorheological fluid chamber with the damper piston head having a fluid flow gap between the first upper variable volume magnetorheological fluid chamber and the second lower variable volume magnetorheological fluid chamber with a piston head fluid flow interface length HL with contact between the piston head OD and the damper tubular housing inner wall ID inhibited. The method includes providing a magnetorheological damper fluid and disposing the magnetorheological damper fluid in the damper tubular housing.

In an embodiment the invention includes a method of making a controllable damper for controlling motion. The method includes providing a longitudinal damper tubular housing having a longitudinally extending axis and an inner wall for containing a fluid within the tubular housing. The longitudinal damper tubular housing has a first end and a second distal end. The method includes providing a piston rod bearing assembly, the piston rod bearing assembly having a piston rod bearing seal interface length BL for supporting a damper piston within the longitudinal damper tubular housing. The method includes providing a damper piston, the damper piston including a piston head and a longitudinal piston rod for supporting the piston head within the longitudinal damper tubular housing. The method includes disposing the piston rod bearing assembly in the longitudinal damper tubular housing proximate the first upper end. The method includes receiving the damper piston longitudinal piston rod in the piston rod bearing assembly, wherein the piston head is movable within the damper tubular housing along the longitudinal length of the tubular housing, with the damper piston head providing a first upper variable volume fluid chamber and a second lower variable volume fluid chamber and a fluid flow gap between the first upper variable volume fluid chamber and the second lower variable volume fluid chamber with a piston head fluid flow interface length HL, with HL<BL and contact between the piston head and the damper tubular housing inner wall inhibited.

In an embodiment the invention includes a method of making a controllable damper for controlling motion. The method includes providing a longitudinal damper tubular housing having a longitudinally extending axis and an inner wall for containing a magnetorheological fluid within the tubular housing. The longitudinal damper tubular housing has a first upper end and a second distal lower end. The method includes providing a piston rod bearing assembly, the piston rod bearing assembly having a piston rod bearing seal interface length BL for supporting a damper piston within the longitudinal damper tubular housing. The method includes providing a damper piston, the damper piston including a magnetorheological fluid piston head and a longitudinal piston rod for supporting the piston head, the magnetorheological fluid piston head including an injected pressurized polymer overmolded electromagnetic magnetorheological fluid coil. The method includes disposing the piston rod bearing assembly in the longitudinal damper tubular housing proximate the first upper end. The method includes receiving the damper piston longitudinal piston rod in the piston rod bearing assembly wherein the magnetorheological fluid piston head is movable within the damper tubular housing along the longitudinal length of the tubular housing, with the damper piston head providing a first upper variable volume magnetorheological fluid chamber and a second lower variable volume magnetorheological fluid chamber and a fluid flow gap between the first upper variable volume magnetorheological fluid chamber and the second lower variable volume magnetorheological fluid chamber. The method includes providing a magnetorheological damper fluid and disposing the magnetorheological damper fluid in the damper tubular housing wherein a current supplied to the overmolded electromagnetic coil controls the flow of the magnetorheological damper fluid proximate the injected pressurized polymer overmolded electromagnetic magnetorheological fluid coil.

In an embodiment the invention includes a method of making a controllable damper for controlling motion. The method includes providing a longitudinal damper tubular housing having a longitudinally extending axis, the housing having an inner wall for containing a magnetorheological fluid within said tubular housing. The longitudinal damper tubular housing includes a first upper end and a second distal lower end.

The method includes providing a piston rod bearing assembly, the piston rod bearing assembly having a piston rod bearing seal interface for supporting a damper piston within said longitudinal damper tubular housing. The method includes providing a damper piston, the damper piston including a magnetorheological fluid piston head assembly and a longitudinal piston rod for supporting the piston head assembly, the magnetorheological fluid piston head assembly including a first upper magnetic pole and a second lower magnetic pole with an overmolded electromagnetic magnetorheological fluid coil between the first upper magnetic pole and the second lower magnetic pole. The first and second magnetic poles are formed from a magnetic material, and the overmolded electromagnetic magnetorheological fluid coil is formed from an electrical conductor insulated wire coil overmolded with a nonmagnetic polymer with the nonmagnetic polymer including molded polymer coil guides. The method includes disposing the piston rod bearing assembly in the longitudinal damper tubular housing proximate the first end, and receiving said damper piston longitudinal piston rod in the piston rod bearing assembly. The magnetorheological fluid piston head is movable within the damper tubular housing along the longitudinal length of the tubular housing, with the damper piston head providing a first upper variable volume magnetorheological fluid chamber and a second lower variable volume magnetorheological fluid chamber. The damper piston head provides a fluid flow gap between the first upper variable volume magnetorheological fluid chamber and the second lower variable volume magnetorheological fluid chamber. The method includes providing a magnetorheological damper fluid and disposing the magnetorheological damper fluid in the damper tubular housing wherein a current supplied to the overmolded electromagnetic magnetorheological fluid coil controls the flow of the magnetorheological damper fluid proximate the overmolded electromagnetic magnetorheological fluid coil.

In an embodiment the invention includes a controllable damper for controlling motion. The controllable damper includes a longitudinal damper tubular housing having a longitudinally extending axis, the longitudinal damper tubular housing having an inner wall for containing a fluid within said tubular housing, the damper tubular housing inner wall having a damper tubular housing inner wall ID. The controllable damper includes a damper piston, the damper piston comprised of a piston head movable within the damper tubular housing along a longitudinal length of said tubular housing, the piston head having a piston head OD, with the damper piston head providing a first upper variable volume fluid chamber and a second lower variable volume fluid chamber. The damper piston head having a fluid flow gap between said piston head OD and damper tubular housing inner wall ID, and between the first upper variable volume fluid chamber and the second lower variable volume fluid chamber with a piston head fluid flow interface length HL. The damper piston having a longitudinal piston rod for supporting the piston head with a piston rod bearing assembly disposed between the longitudinal damper tubular housing and the longitudinal piston rod. The damper includes a means for inhibiting contact between the piston head OD and the damper tubular housing inner wall ID.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE SEVERAL VIEWS OF THE DRAWINGS

FIGS. 4A-D illustrate a controllable suspension system strut.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

Figure 1:
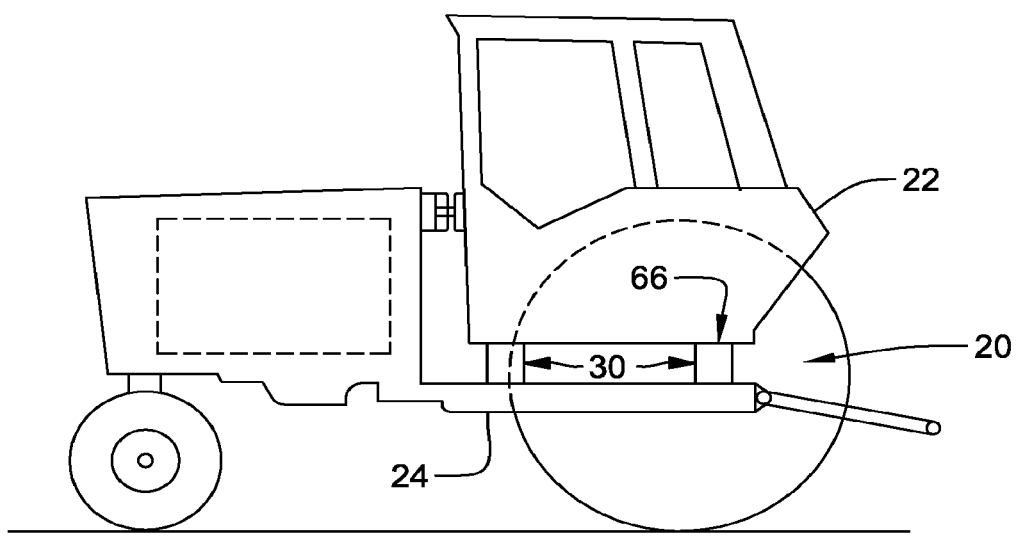
FIG. 1 illustrates a vehicle, with a vehicle cab and a controllable suspension system.
Figure 2A:
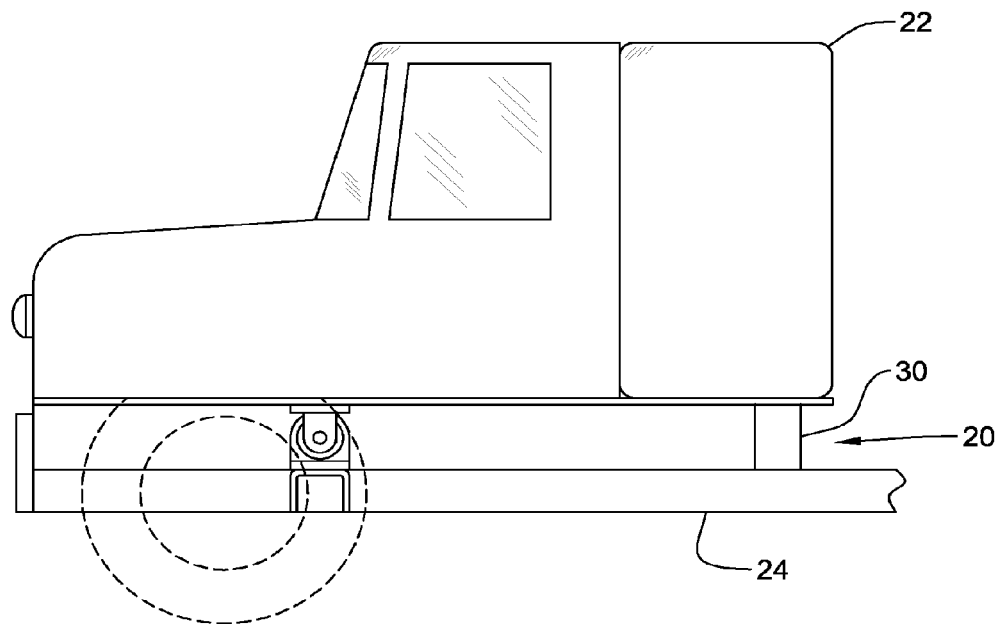
FIGS. 2A-B illustrate a vehicle cab with a controllable suspension system.
Figure 2B:
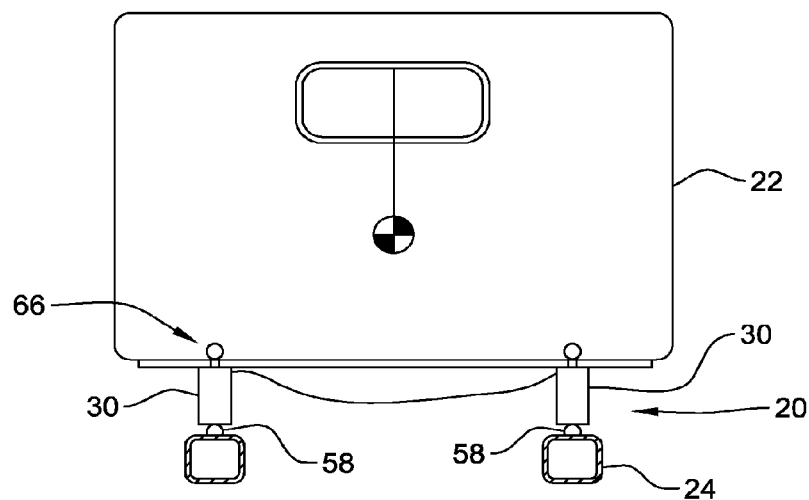
Figure 3:
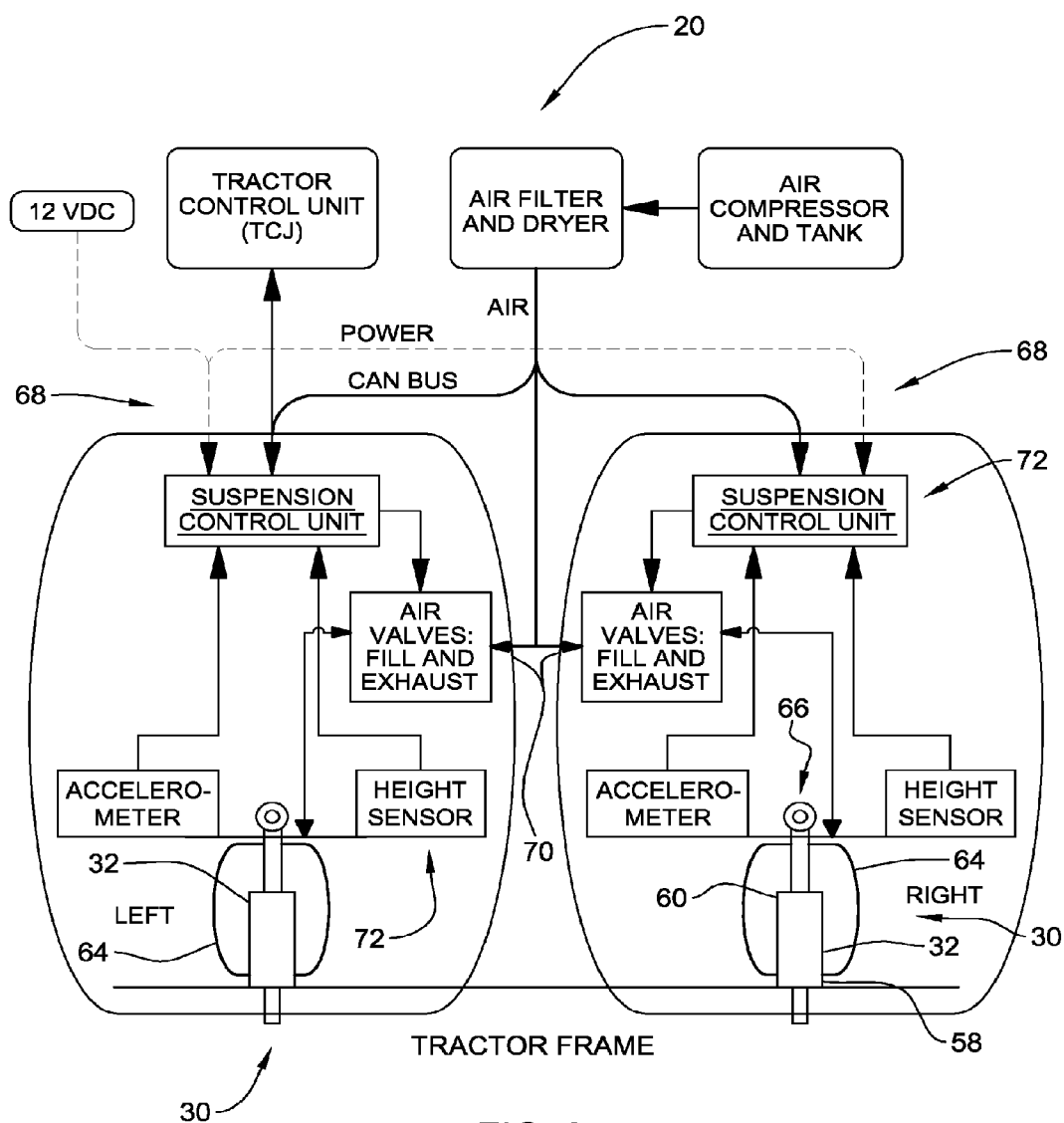
FIG. 3 illustrates a tractor controllable suspension system.
Figure 5:
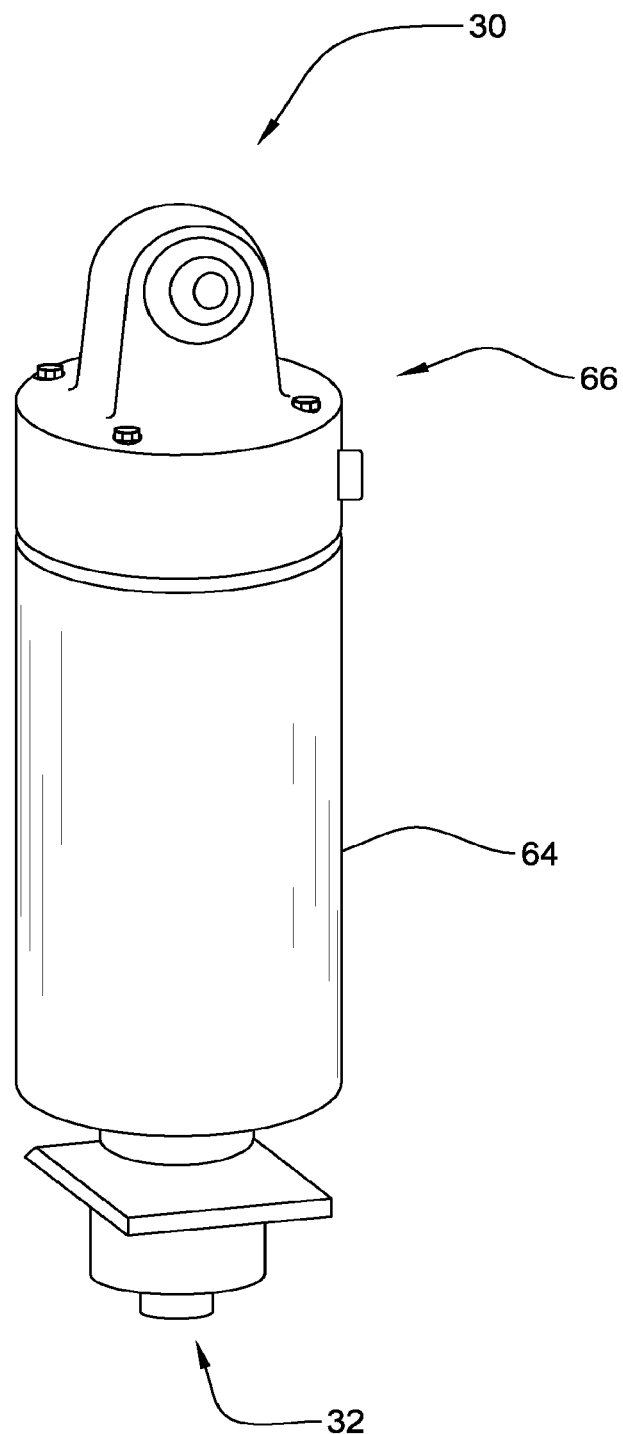
FIG. 5 illustrates a controllable suspension system strut.
Figure 6D:
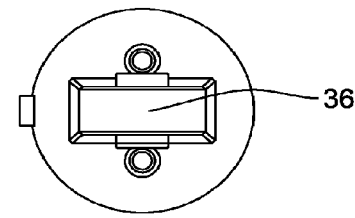
FIGS. 6A-N illustrate a controllable suspension system strut.
Figure 6A:
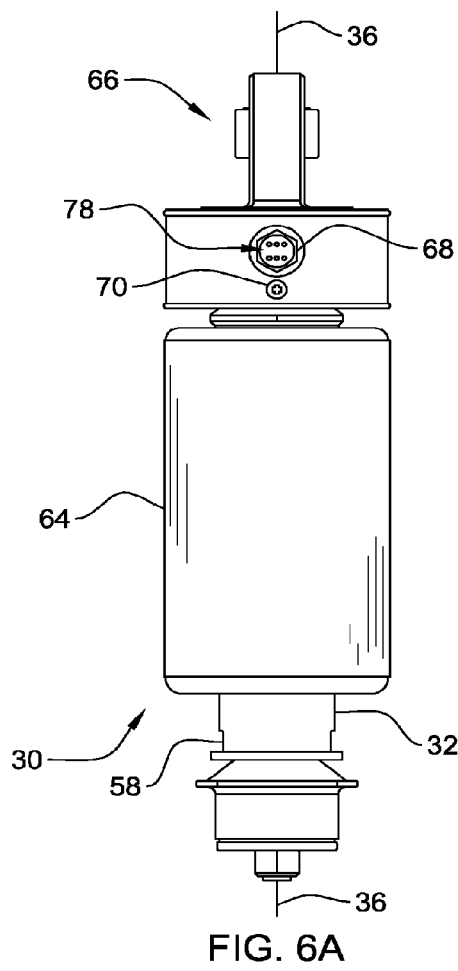
Figure 6B:
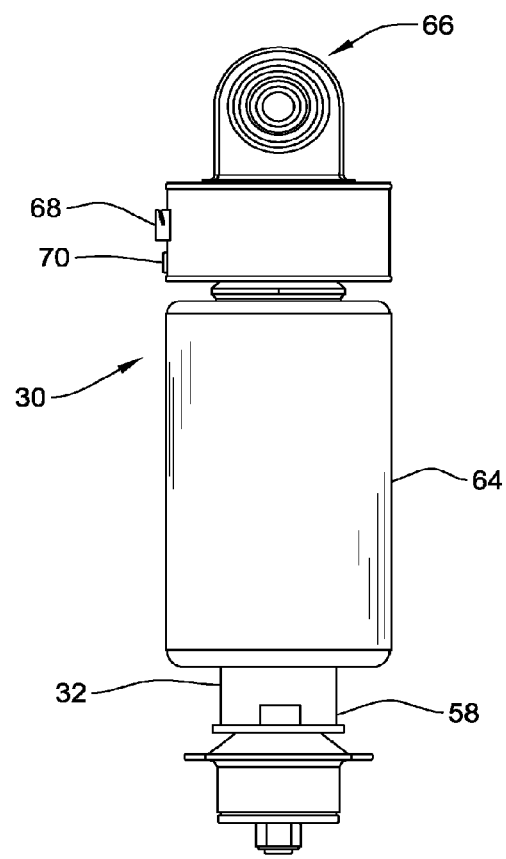
Figure 6C:
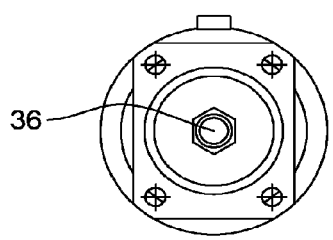
Figure 6E:
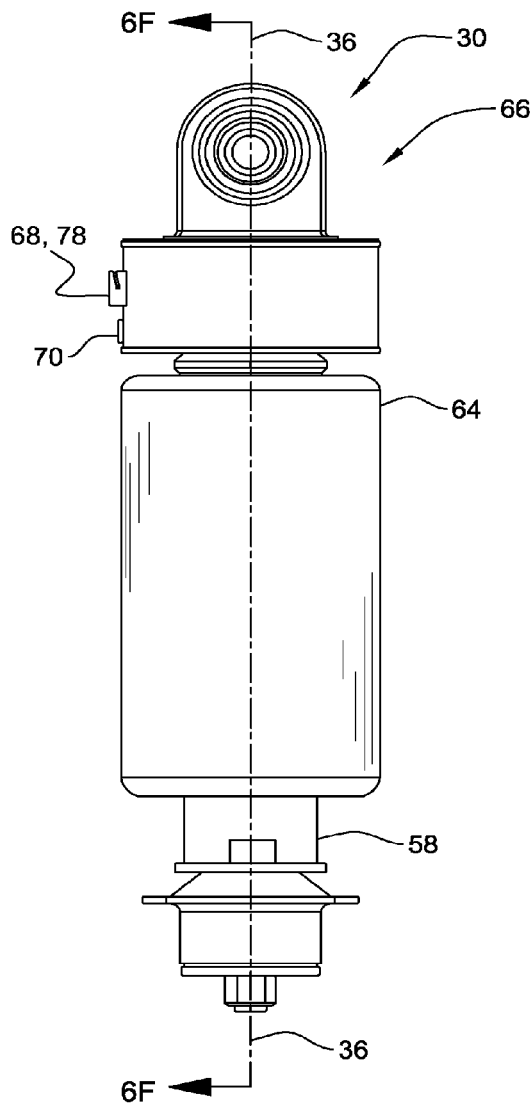
Figure 6F:
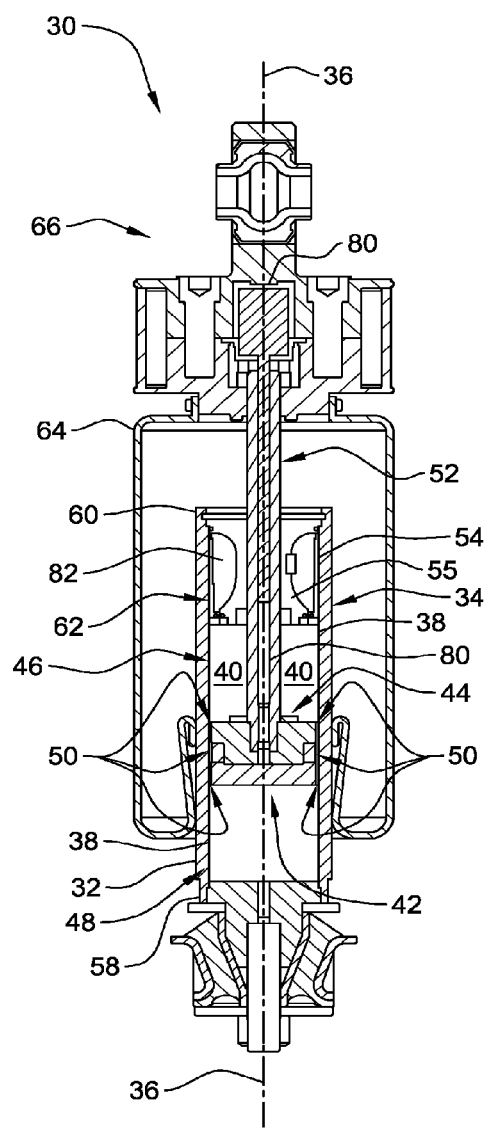
Figure 6G:
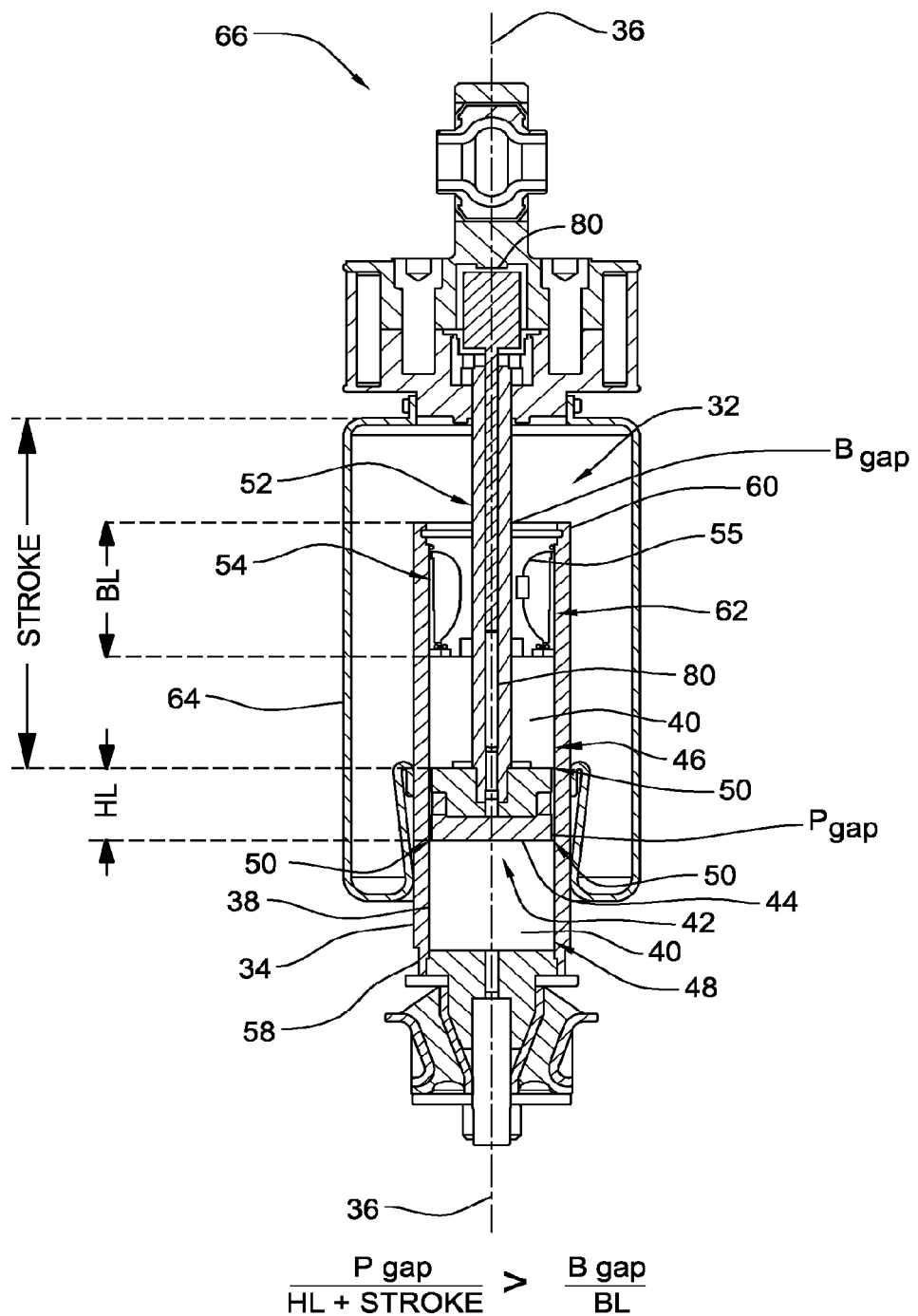
Figure 6H:
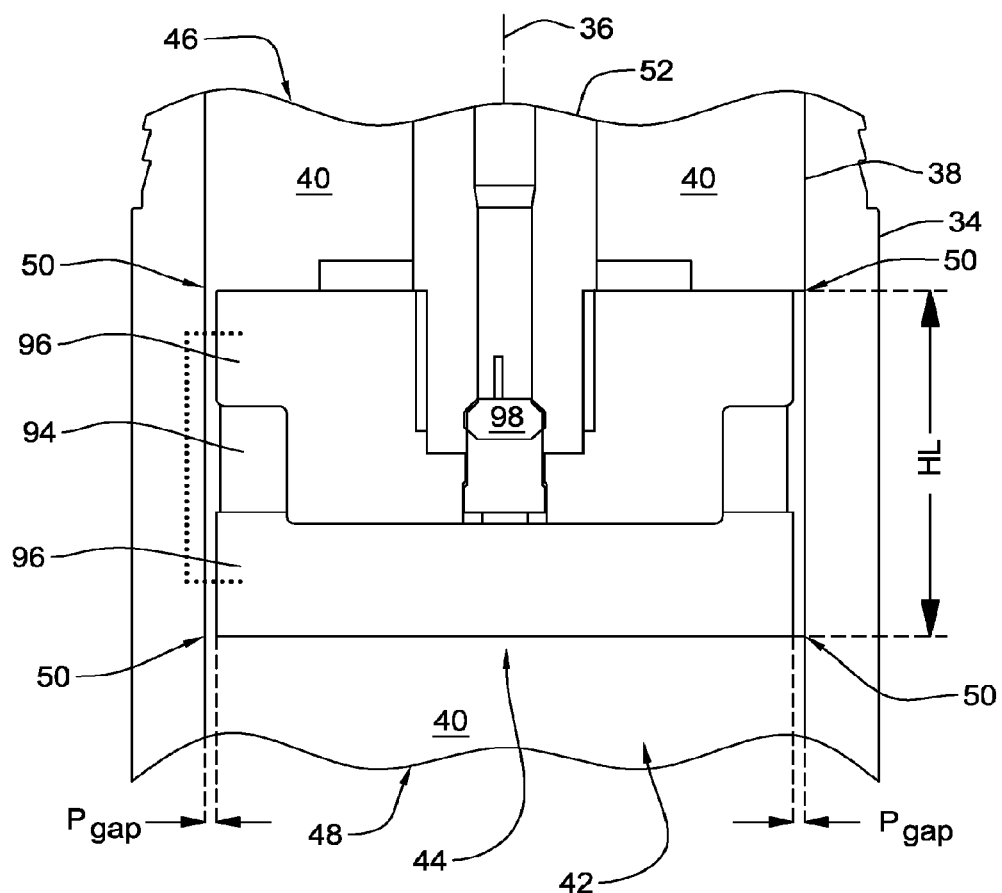
Figure 6I:
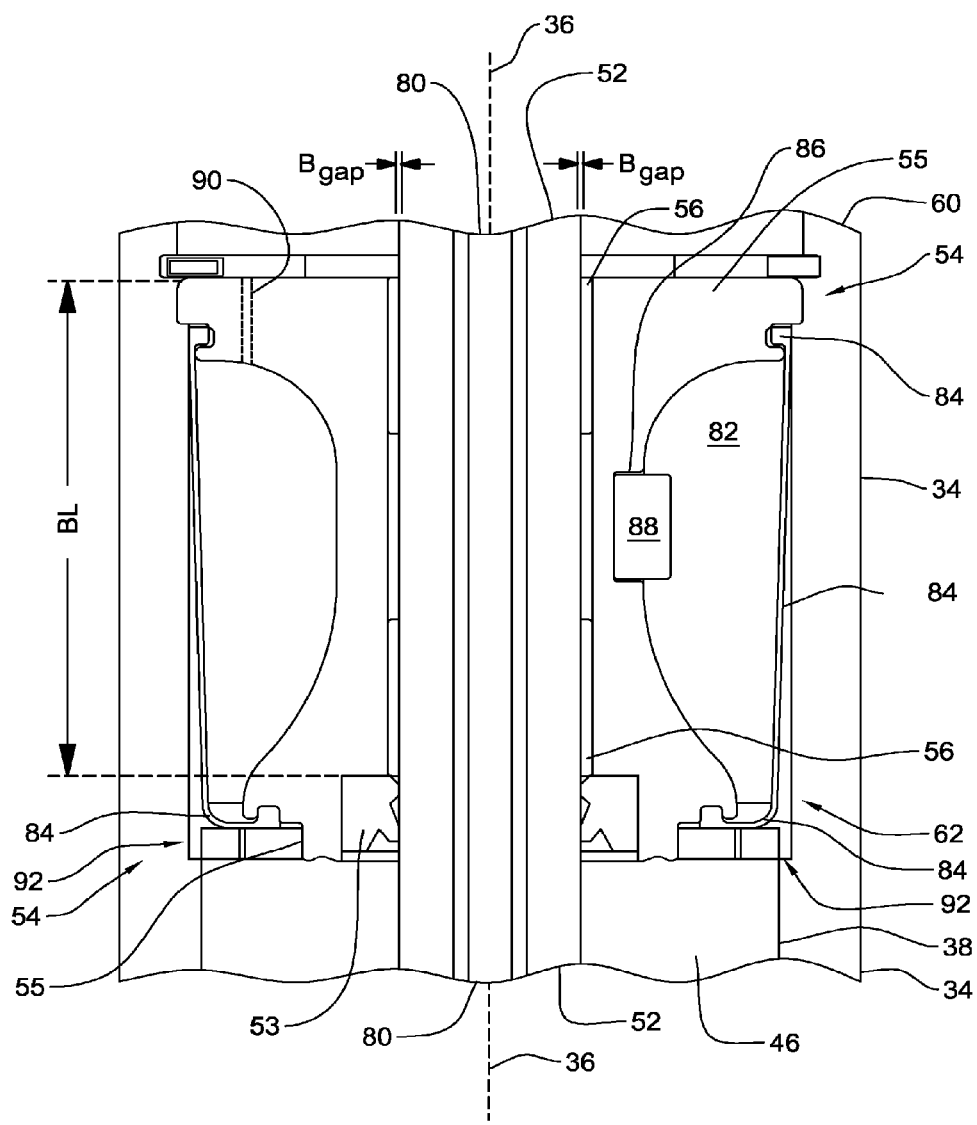
Figure 6J:
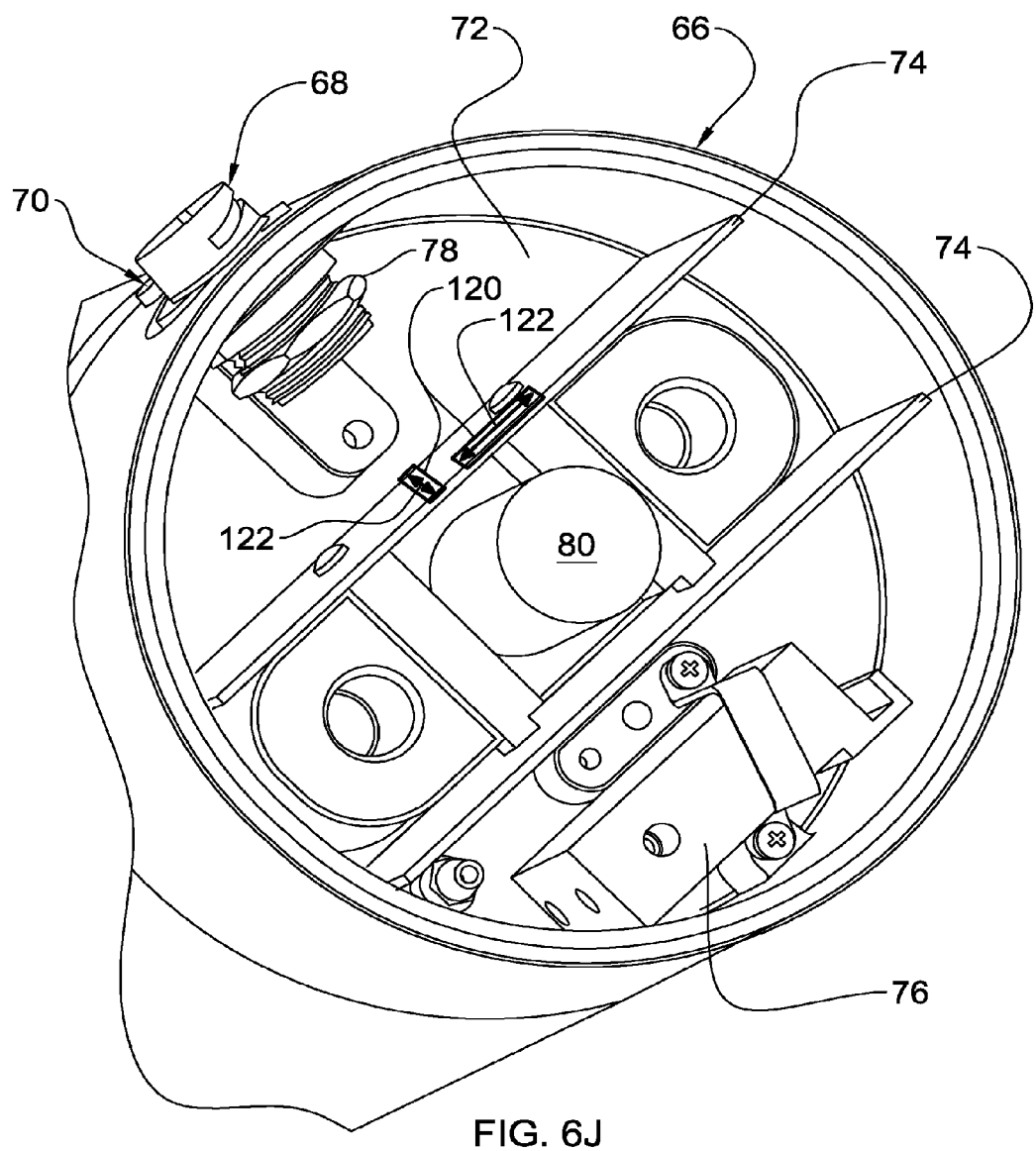
Figure 6K:
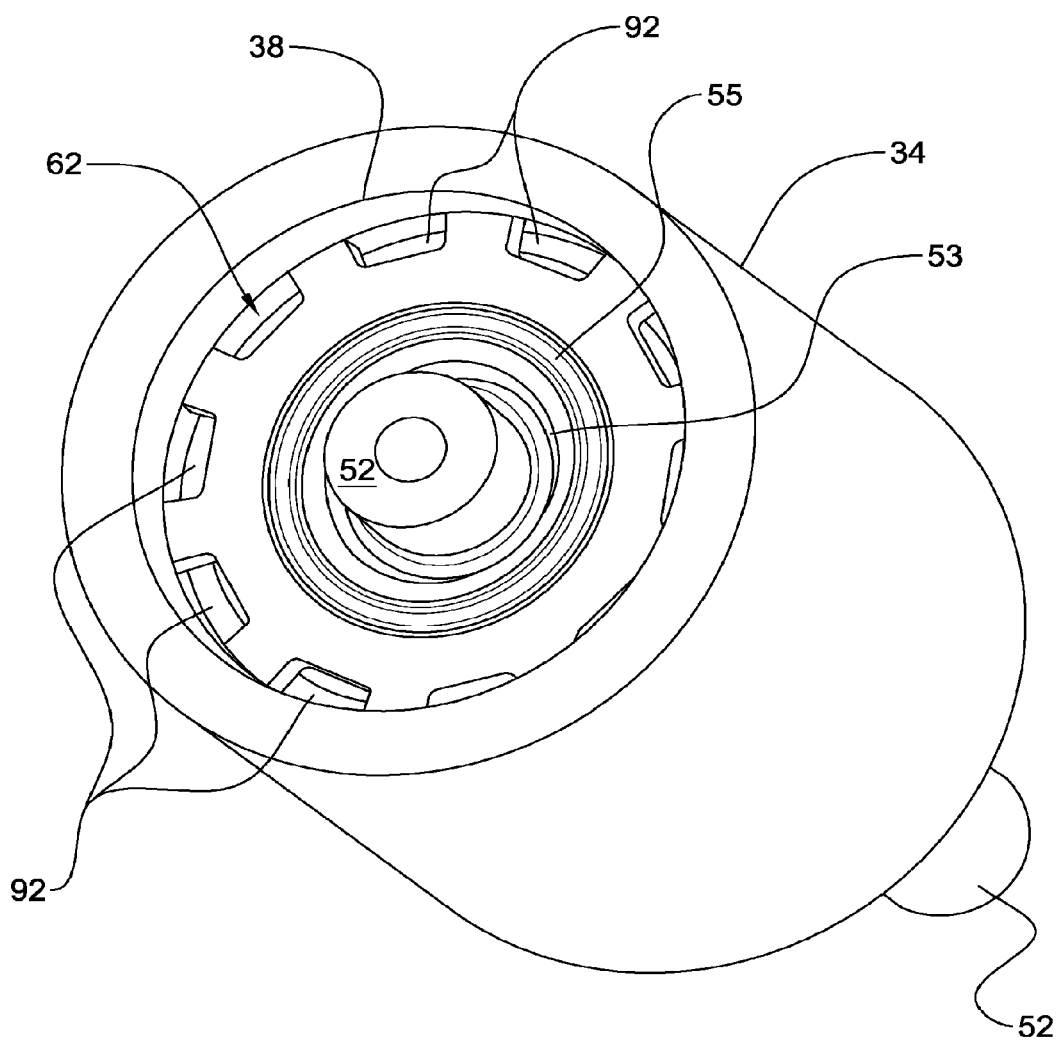
Figure 6L:
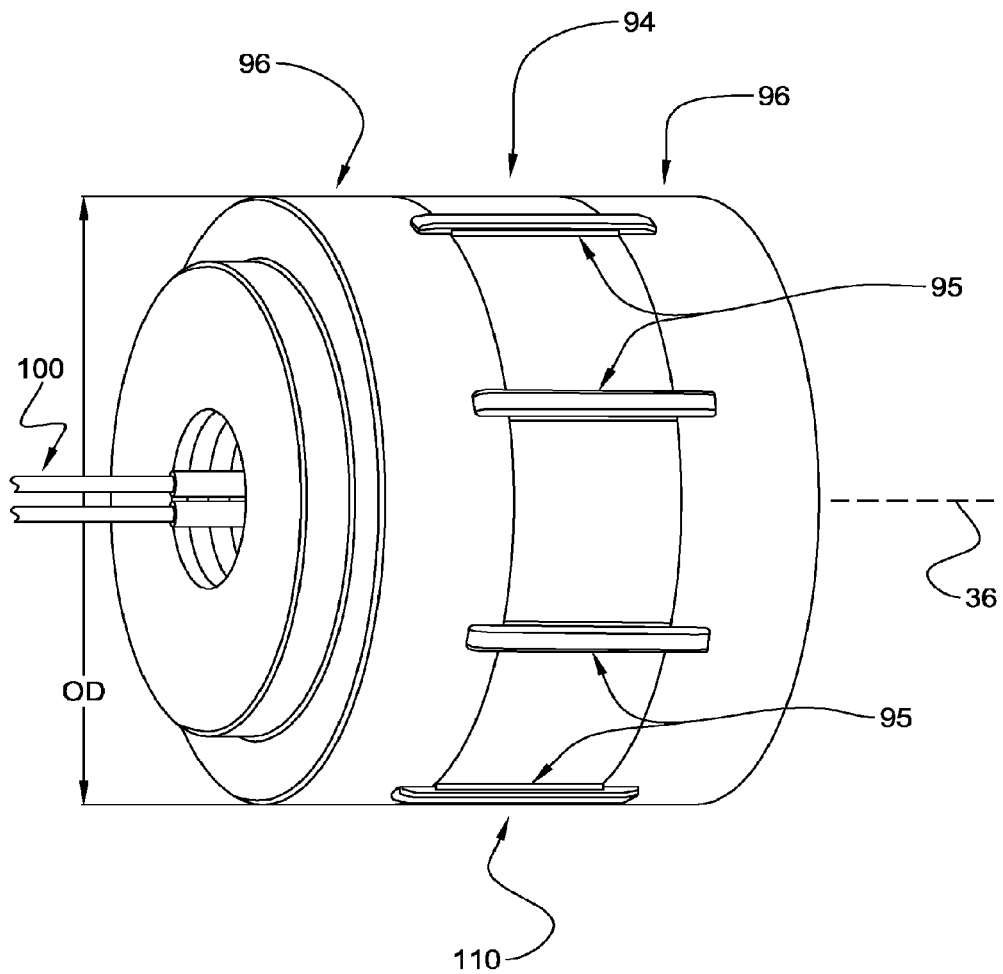
Figure 6M:
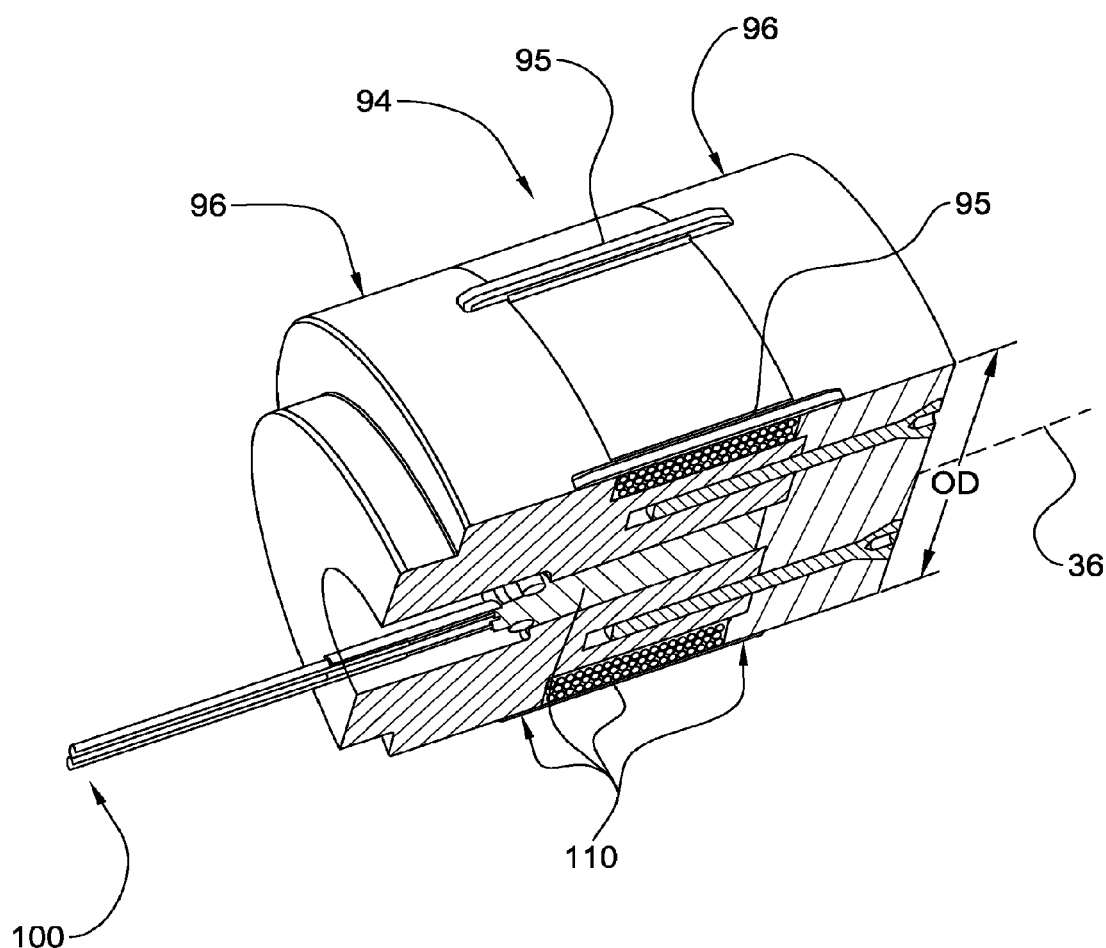
Figure 6N:
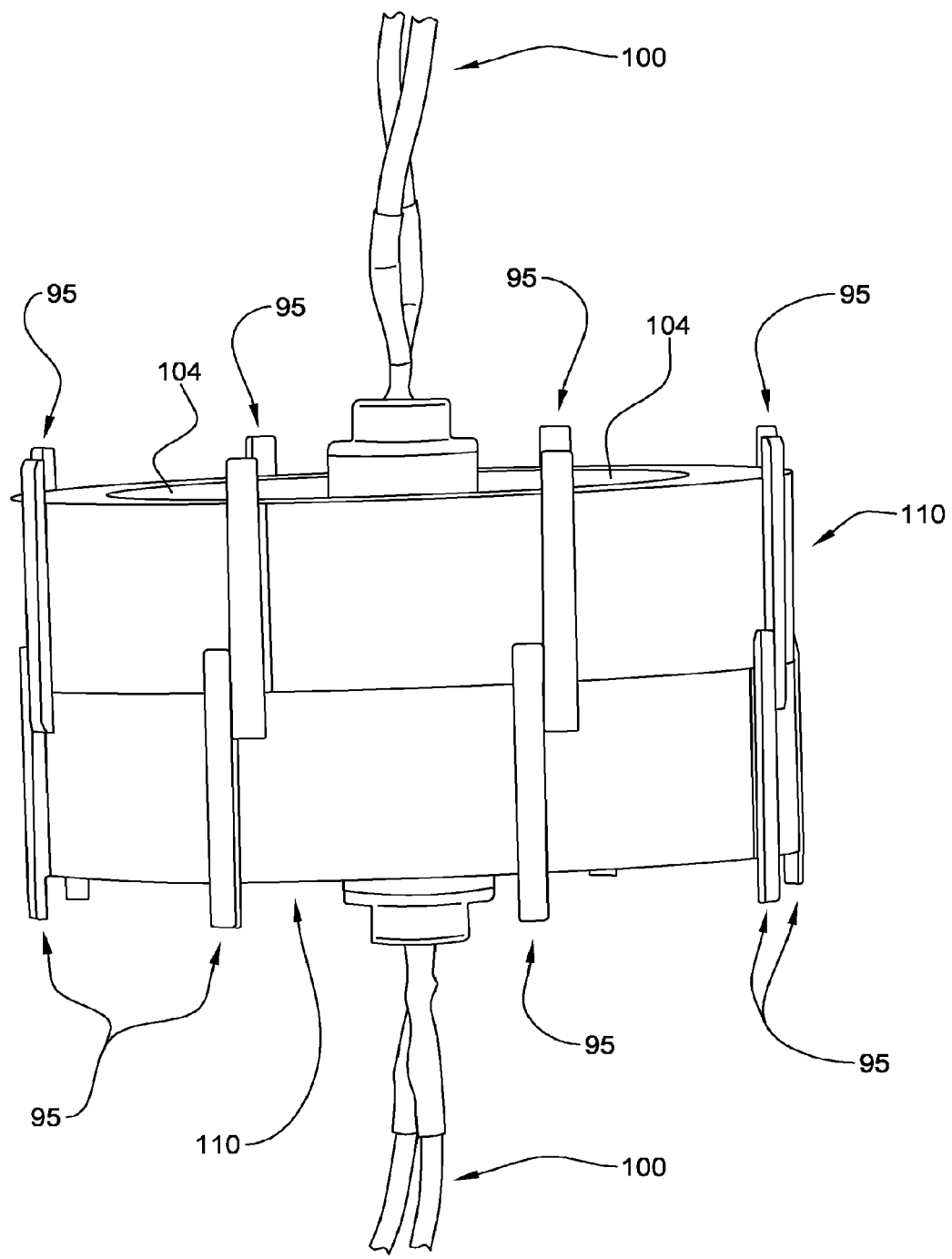

In an embodiment the invention includes a controllable suspension system for controlling the relative motion between a first body and a second body. The controllable suspension system 20 controls the relative motion between a first body 22 and a second body 24 such as shown in FIGS. 1-3. In preferred embodiments the controllable suspension system 20 is a vehicle controllable suspension system 20, most preferably as shown in FIGS. 1-3 a cab suspension controllable suspension system 20, with the suspension system controlling motion between the vehicle cab body 22 and the vehicle frame body 24. In alternative embodiments the suspension system is a non-vehicle suspension system, preferably a stationary suspension system. The controllable suspension system 20 includes at least one strut 30. The controllable suspension system strut 30 includes a single ended magnetorheological fluid damper 32, preferably a cantilevered single ended magnetorheological fluid damper. The magnetorheological fluid damper 32 includes a longitudinal damper tubular housing 34 having a longitudinally extending axis 36, the longitudinal damper tubular housing 34 having an inner wall 38 for containing a magnetorheological fluid 40 within the tubular housing 34. Preferably the longitudinal damper tubular housing 34 is comprised of a magnetic metal material, preferably a magnetic low carbon steel as compared with a nonmagnetic metal material such as stainless steel. Preferably the magnetorheological fluid 40 is a magnetorheological damper fluid with the fluid containing iron particles wherein the rheology of the damper fluid changes from a free flowing liquid to a flow resistant semi-solid with controllable yield strength when exposed to a magnetic field, such as the LORD MR fluids available from LORD Corporation, Cary, N.C. The magnetorheological fluid damper 32 includes a cantilevered damper piston 42, the damper piston 42 including a piston head 44 movable within the damper tubular housing 34 along a longitudinal length of the tubular housing axis 36. The damper piston head 44 provides a first upper variable volume magnetorheological fluid chamber 46 and a second lower variable volume magnetorheological fluid chamber 48. The damper piston head 44 has a fluid flow gap 50 between the first upper variable volume magnetorheological fluid chamber 46 and the second lower variable volume magnetorheological fluid chamber 48 with a piston head fluid flow interface length HL, with the fluid flow gap 50 between the piston head 44 and inner wall surface 38 of the tubular housing 34 with a piston gap Pgap between the OD of the piston head 44 and the ID of the inner wall 38. The damper piston 42 includes a longitudinal cantilevered piston rod 52 for supporting the piston head 44 within the longitudinal damper tubular housing 34. The damper piston 42 is supported within the longitudinal damper tubular housing 34 with an upper piston rod bearing assembly 54 disposed between the longitudinal damper tubular housing 34 and the longitudinal piston rod 52. The piston rod bearing assembly 54 has a piston rod bearing seal interface length BL with BL>HL and contact between the piston head 44 and the damper tubular housing inner wall 38 is inhibited. Preferably the bearing assembly 54 has a minimal bearing gap Bgap between the bearings 56 and the OD of the piston rod 52. As shown in FIG. 6G, preferably [Pgap/(HL+Stroke)] is greater than (Bgap/BL). Preferably the piston head 44 is a wearband-free piston head, with the fluid flow gap 50 maintained between piston head sides OD and tubular housing inner wall ID with no wear band or seal on the piston between piston head 44 OD and inner wall 38 ID. In embodiments such as shown in FIGS. 6L-6N, axially aligned coil guides 95 are preferably utilized to maintain fluid flow gap 50 and inhibit contact between the piston head 44 and the housing wall 38. Preferably the axially aligned coil guides 95 are aligned with axis 36, and preferably substantially equally spaced around the outside perimeter of EM coil 94, preferably with at least three coil guides 95, more preferably at least four guides, more preferably at least five guides, and more preferably at least six guides spaced around the OD of EM coil 94, preferably with the guides 95 occupying less than 15% of the perimeter of the EM coil, and more preferably no greater than 10% of the perimeter of the EM coil. Preferably the guides 95 are a nonmagnetic material, preferably a polymer, preferably with the guides 95 comprised of injection pressurized polymer 110 with the guides molded integral and simultaneously with their adjacent bobbin polymer overmold 110 that is pressure injected into a overmold 106, with the nonmagnetic polymer guides and overmold polymer 110 encompassing and covering the underlying wound EM coil wiring 102. Preferably the axially aligned guides 95 axially extend over the adjacent magnetic poles 96. The cantilevered damper piston 42 preferably minimizes the off state resistance of the damper with a minimized parasitic drag and resistance. Preferably the cantilevered damper piston 42 off state energy dissipation is minimized by substantially inhibiting contact between piston head 44 and housing wall 38 while maintaining the predetermined fluid flow gap 50 and the gap width Pgap, preferably while not utilizing a piston wear band or piston seal that encircles the piston perimeter.

Preferably the piston 42 has a constant bearing length in that the piston head 44 has no substantial bearing contact with the housing inner wall 38, with the cantilevered piston 42 providing a single ended damper 32 as compared to a double ended damper. Preferably the rod 52 terminates with the piston head 44, with the piston head unconnected to the housing 34 except for the single bearing assembly 54. Preferably the rod 52 and the piston head 44 are unconnected to the lower housing end 58 distal from the piston rod bearing 54 and the upper housing end 60. Preferably the only mechanical connection of the piston head 44 is with the single piston rod 52 extending to the upper bearing assembly 54, with rod 52 terminating with the piston head 44, with no contact of piston head 44 with housing inner side walls 38 or the lower damper end 58 distal from the upper damper end 60 with the bearing 54. In embodiments contact of piston head 44 is inhibited with minimized perimeter occupying axially aligned guides 95. Preferably the piston head 44 is free of internal fluid flow conduits, preferably with substantially all fluid flow between the piston head 44 and housing 34 through the fluid flow gap 50, preferably with the fluid flow gap maintained with assistance of guides 95 which assist in ensuring that substantial contact between the piston head 44, particularly the magnetic poles 96, and the housing inner side walls 38 is inhibited. Preferably the magnetorheological fluid damper 32 includes an upper volume compensator 62. The magnetorheological fluid damper volume compensator 62 preferably is proximate the piston rod bearing assembly 54. Preferably the volume compensator 62 is adjacent the upper piston rod bearing 54. Preferably the bearing holder support structure housing 55 and the volume compensator housing are integrated together to provide an upper bearing gas charged compliance member. Preferably the gas compliance volume compensator 62 is in fluid communication with the first upper variable volume magnetorheological fluid chamber 46, with the volume compensator proximate the upper bearings 56 and the piston rod 52, preferably with upper fluid chamber 46 and volume compensator 62 in use in the suspension system 20 oriented on top relative to the force of gravity to allow gas bubble migration into volume compensator 62. Preferably the damper 32 configuration provides for a dry assembly process with the magnetorheological fluid filled into the damper after the piston 42 is assembled into the housing 34, and preferably then gas pressure charging of gas compliance volume compensator 62.

Preferably the strut 30 includes a longitudinal air gas spring 64, with the longitudinal gas spring 64 aligned with the longitudinal damper tubular housing longitudinally extending axis 36. Preferably the strut 30 includes the strut air spring 64 and the magnetorheological fluid damper 32 aligned with the common center axis 36 and packaged together with the gas spring 64 encompassing the damper 32, with the upper end of the damper including the piston rod 52, substantially housed within the gas spring 64. Preferably the upper end of the strut 30 includes an upper strut end head member 66 for attachment to the uppermost first body 22. Preferably the upper strut end head member 66 includes an electrical power input 68 and an air compressed gas input 70. Preferably the upper strut end head member 66 has an internal head cavity housing that includes a strut control system 72 with an electronic control circuit board 74, gas spring air sleeve leveling valve 76, and preferably also includes a high speed electrical communications connection 78, such as a CAN-Bus, for receiving outside the strut signals in addition to electrical power input 68. Preferably the upper strut end head member 66 includes a strut sensor system 80, preferably the upper sensor head end of the magneto-strictive longitudinal sensor 80 that is aligned with the piston rod 52 and axis 36 and housed within the piston rod the 52. Preferably the piston rod 52 is comprised of a nonmagnetic material, preferably a non-magnetic metal such as stainless steel, wherein the inner housed magneto-strictive longitudinal sensor 80 provides for sensing the stroke position of the piston along the stroke length of the damper. Preferably the upper strut end member housing 66 includes the strut control system with sensors inputs, sensors, current supply, and also the pneumatic leveling valve to control leveling of the gas spring 64 in addition to controlling the magnetorheological fluid damper 32.

Preferably the upper piston rod bearing assembly 54 includes a bearing holder support structure 55 which receives a first upper bearing 56 and a distal second lower bearing 56 to provide the piston rod bearing seal interface length BL. Preferably the bearing holder support structure 55 receives a bearing seal 53 between the lower bearing 56 and the upper fluid chamber 46. Preferably the upper piston rod bearing assembly 54 includes the bearing holder support structure 55 which receives the at least first bearing 56 and includes compliance member cavity 82 for receiving a volume compensator gas compliance member 84, preferably with the gas compliance member flexible fluid gas partition diaphragm 84 flexibly fixed to the support structure 55 allowing expansion and contraction of the gas filled diaphragm cavity to compensate for magnetorheological fluid volume changes, preferably with the gas compliance member flexible elastomer fluid gas partition diaphragm 84 radially expandable between the support structure 55 and the housing 34. Preferably the upper piston rod bearing assembly 54 includes the bearing holder support structure 55 which receives the at least first bearing 56 and includes a sensor target magnet holder 86 which receives a target magnet 88 for the magnetostrictive sensor 80 in the non-magnetic piston rod 52. Preferably the upper volume compensator 62 is vertically oriented relative to gravity in operation of the suspension system with the volume compensator proximate the piston rod bearing.

Preferably volume compensator 62 is adjacent the upper piston rod bearing assembly 54, preferably with the bearing holder support structure 55 and volume compensator housing cavity 82 integrated to provide an upper damper rod bearing gas charged compliance member. Preferably the rod bearing gas charged compliance member support structure 55 includes a gas compliance charging conduit 90 for filling the cavity 82 with a pressurized gas, preferably after the piston has been assembled into the housing and bearing and the damper has been filled with the magnetorheological fluid. Preferably the volume compensator 62 is in fluid communication with the adjacent damper fluid chamber 46 through a plurality of fluid volume compensating conduits 92 between the housing 34 and the piston rod 52, which allow flow of fluid into and out of the volume compensator, preferably with the conduits 92 providing for greater flow than the piston head gap 50, preferably a relatively high flow into and out compared to piston head flow, with relatively low resistance to flow into the volume compensator such that it is not dynamically isolated from the rest of the working magnetorheological fluid.

The piston head 44 includes the electromagnetic coil 94 and an upper and lower magnetic pole 96 for controlling the flow of magnetorheological fluid 40 between the upper and lower chambers 46 and 48, preferably with the electromagnetic coil 94 comprised of an electrically insulated encapsulant injected pressurized polymer overmolded electromagnetic magnetorheological fluid coil 94. The preferred modular component injected pressurized polymer overmolded electromagnetic magnetorheological fluid coil 94 is shown in FIG. 7. Preferably the EM coil insulated wire 102 is wound on a non-magnetic plastic bobbin 104, with the coiled wire 102 on the bobbin 104 pressure overmolded with an injected pressurized non-magnetic polymer 110 in a pressurized injection overmold 106 under an applied pressure 107.

Figure 7A:
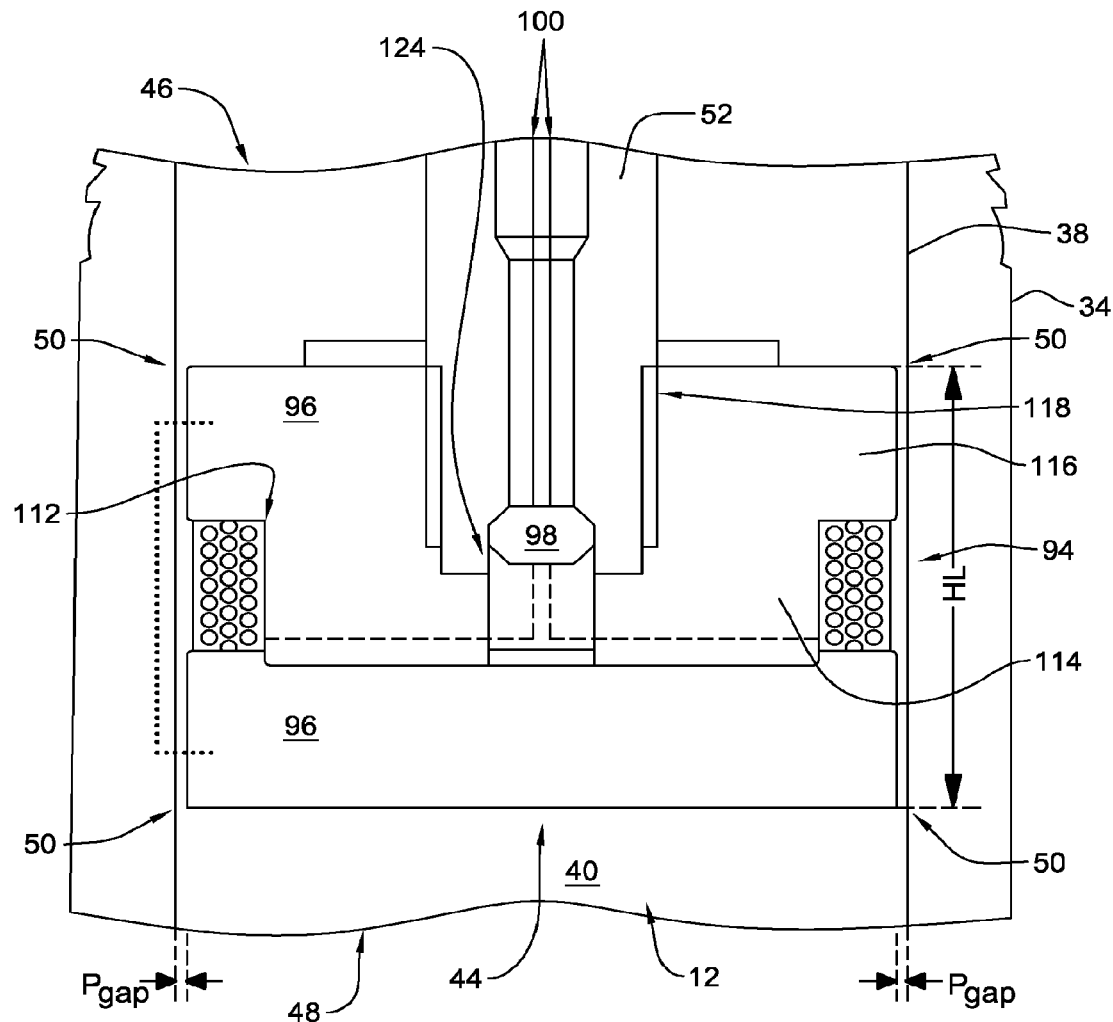
FIGS. 7A-N illustrate controllable suspension system damper components and methods of making damper piston head polymer overmolded electromagnetic coil components.
Figure 7D:
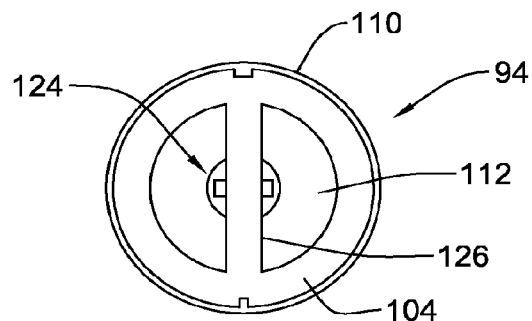
Figure 7C:
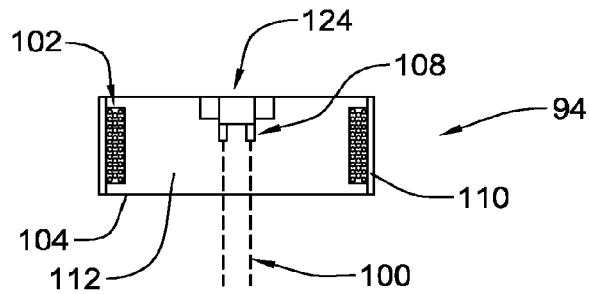
Figure 7F:
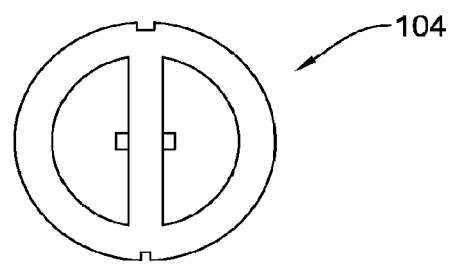
Figure 7E:
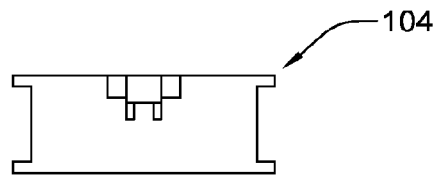
Figure 7H:
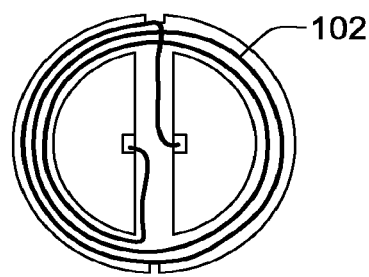
Figure 7G:
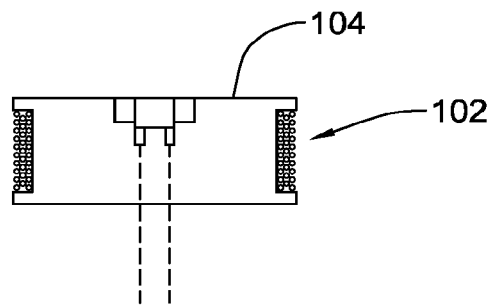
Figure 7I:
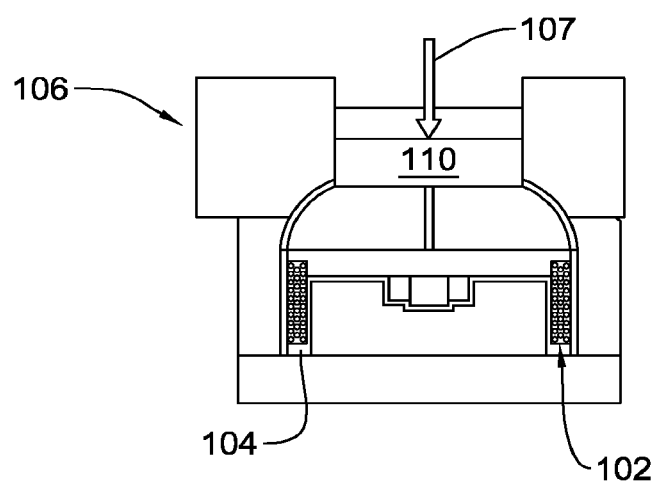
Figure 7J:
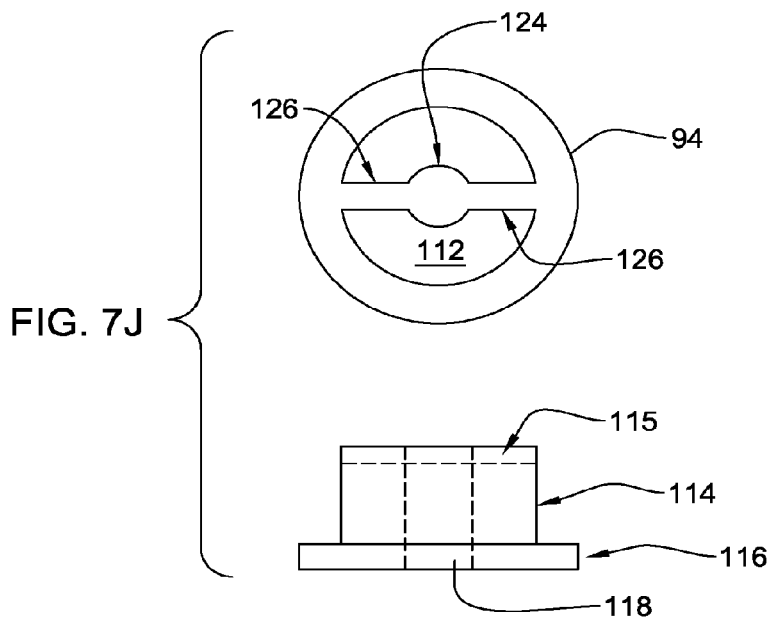
Figure 7K:
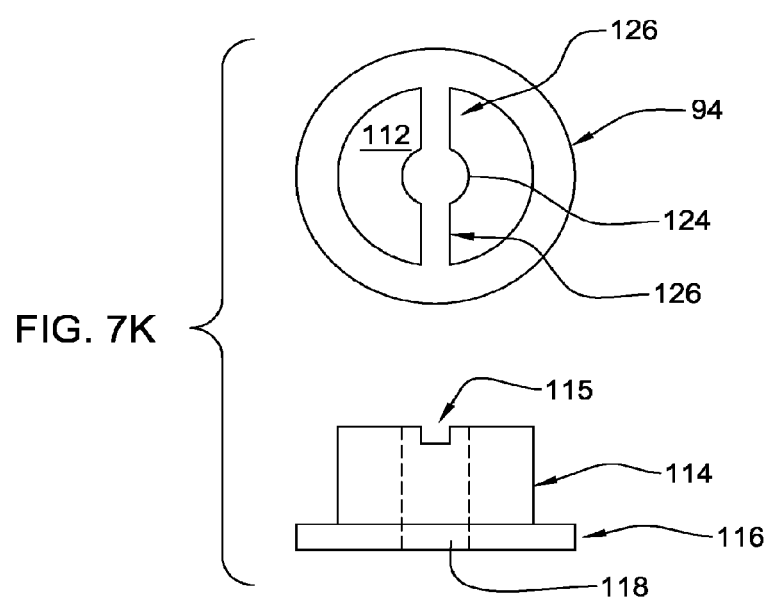
Figure 7L:
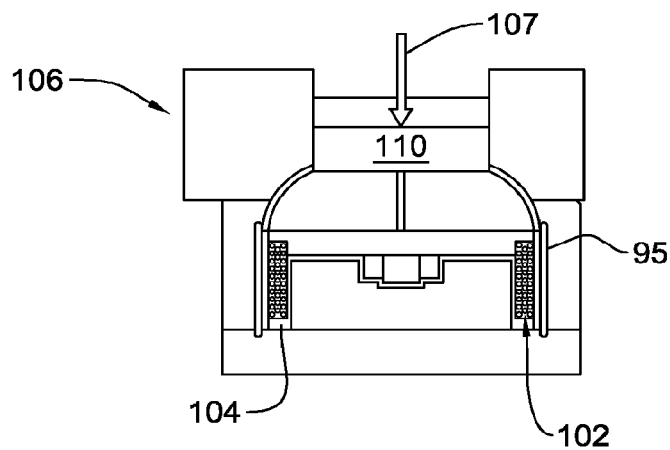
Figure 7M:
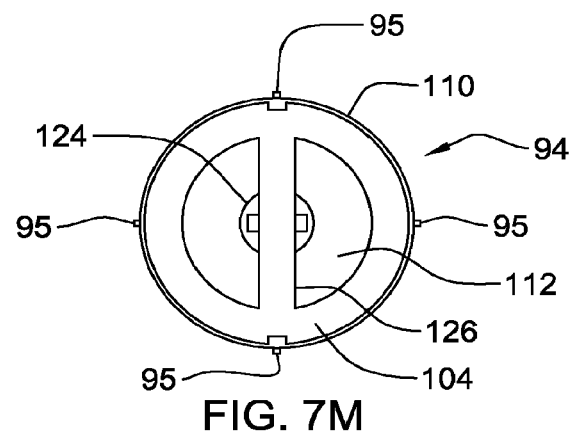
Figure 7N:
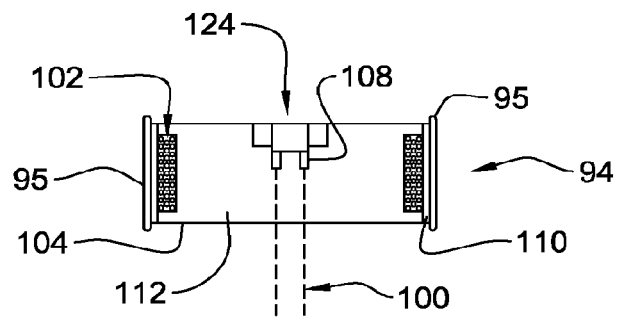
Figure 8:
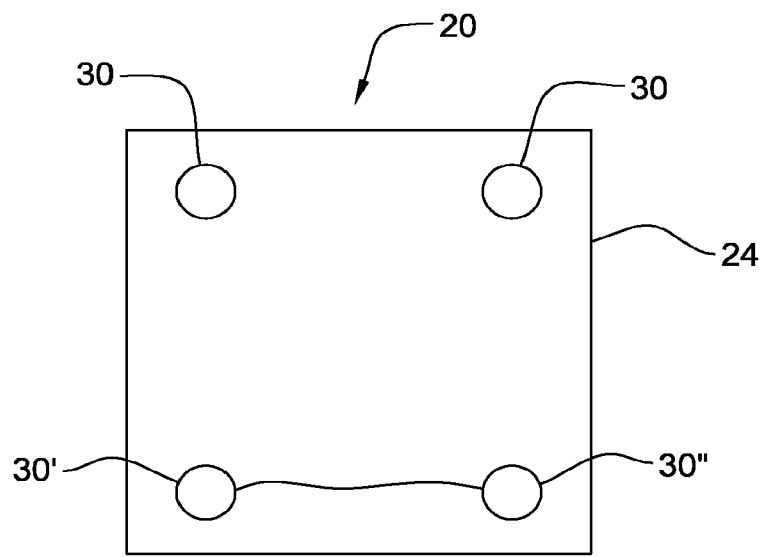
FIG. 8 illustrates a controllable suspension system.
Figure 9:
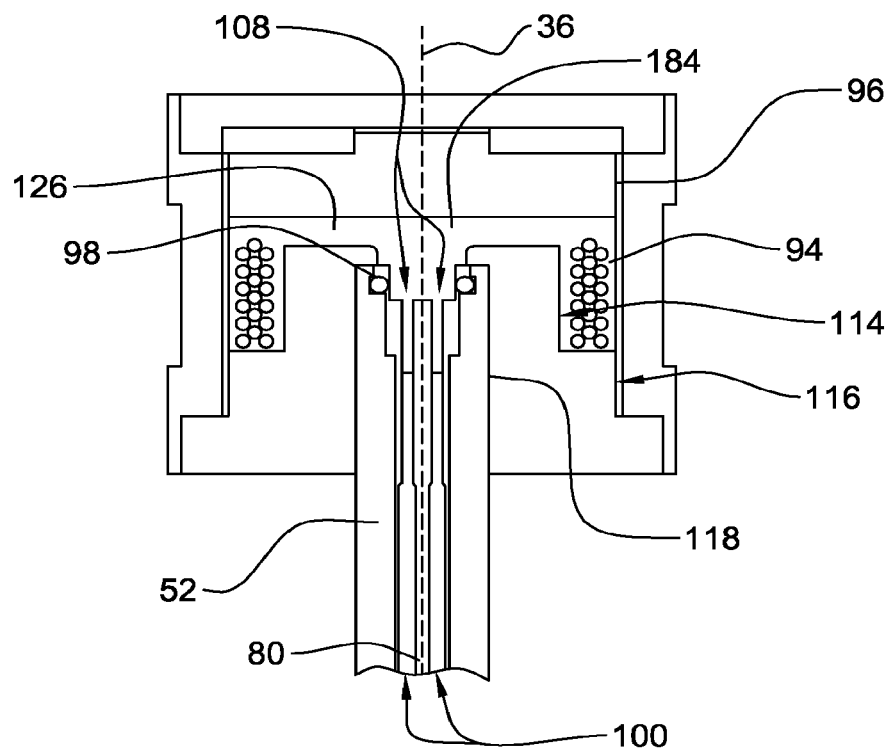
FIG. 9 illustrates controllable suspension system damper components.
Figure 10B:
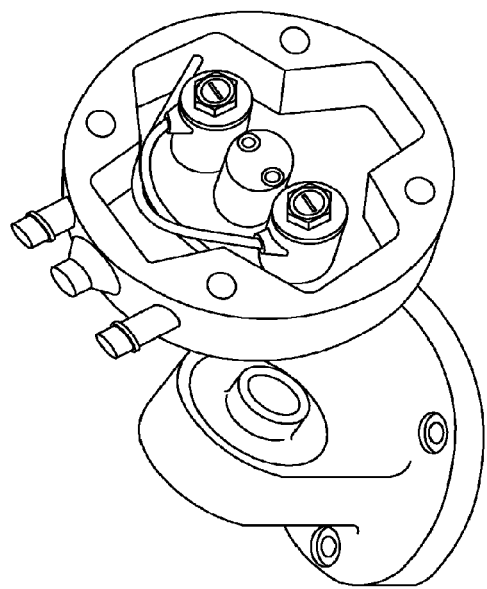
FIGS. 10A-D illustrate a controllable suspension system strut.
Figure 10C:
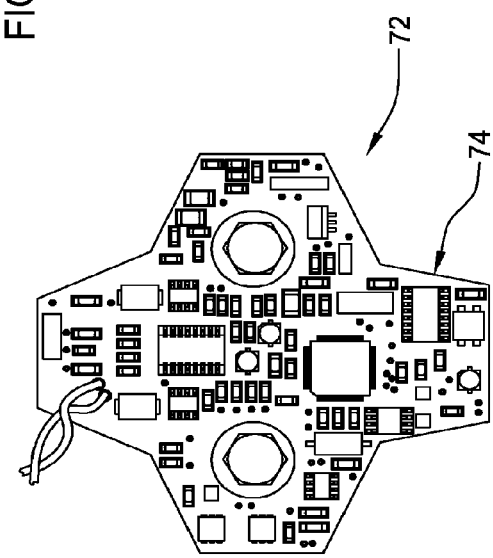
Figure 10A:
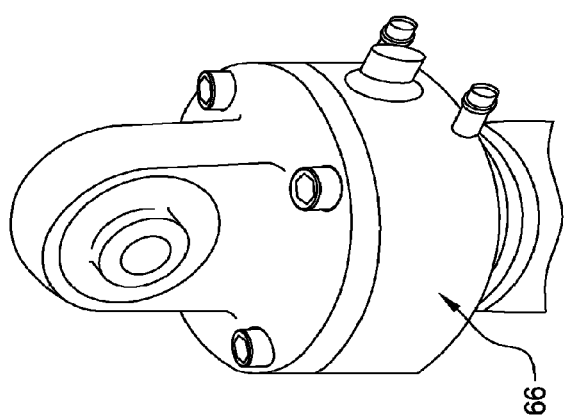
Figure 10D:
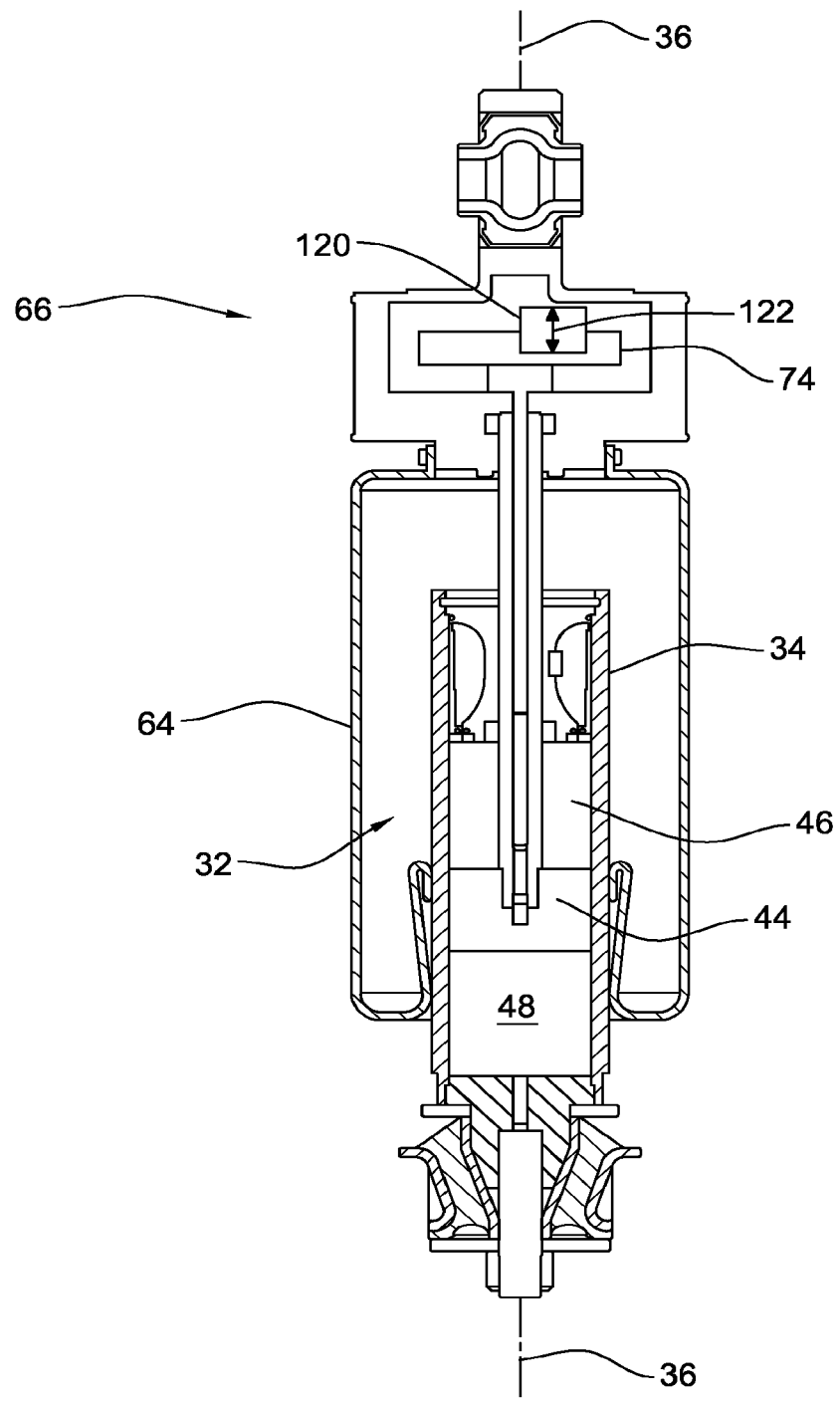

Preferably the pressurized injection overmolded EM coil 94 includes a first and second wire pins 108 for connection with a current supply wire circuit 100. Preferably the modular component pressurized injection overmolded EM coil 94 is sandwiched between upper and lower magnetic metal poles 96, to provide the current controllable EM coil piston head 44, with the modular component pressurized injection overmolded EM coil 94 overmolded EM coil and poles 96 sized to provide the predetermined gap 50 with the housing inner wall 38, with the pressurized injection overmolded EM coil magnetic field controlling magnetorheological fluid flow proximate the piston head EM coil, with preferred embodiments molded with axially aligned guides 95 as shown in FIGS. 7L-N. FIG. 6N show two overmolded EM coils with molded guides 95 placed head to head to illustrate how the guides 95 extend beyond the coil top and bottom sides such that they will overlap the adjacent magnetic poles when assembled into the piston head, with the guides equally spaced around the EM coil outer perimeter in a piston axially centering pattern centered and aligned with the longitudinal extending axis 36 of damper 32.

Preferably the controllable suspension system 20 includes a first strut 30 and at least a second cantilevered magnetorheological fluid damper strut 30 between the first body 22 and the second body 24, preferably with both struts 30 having outer encompassing air spring sleeves 64. Preferably the controllable suspension system 20 includes a third cantilevered magnetorheological fluid damper strut 30 between the first body and the second body. Preferably at least two of the more than one struts 30 operate independently with their own self contained sensor and control systems in their strut head member housing 66, preferably with no master control signals communicating between the at least two struts from a suspension system master controller. Preferably the struts 30 are self-contained self-controlled struts that house their own control systems, preferably with only electrical power and compressed gas supplied from a master suspension system source, such as a vehicle battery electrical power system and a compressed air system. In a preferred embodiment with the more than one strut 30 operating, preferably such as with four struts, a first master controlling strut 30" controls a second controlled dependent strut 30' with master control signals communicating between the at least two struts 30" and 30', such as with the master strut 30" that sends controls to the other dependent strut 30" in addition to its own control. In a preferred embodiment the suspension system 20 is a cab suspension system with two back cab struts 30 and the front of the vehicle cab is mounted without such controllable cantilevered magnetorheological fluid damper struts 30, such as hard mount or mounted with noncontrolled elastomer mounts. In a preferred cab suspension system 20 embodiment with two rear back cab struts 30 and the front of the vehicle cab is mounted without such controllable cantilevered magnetorheological fluid damper struts 30, the struts 30 are self controlled and autonomous with each having its own circuit board control system, with the strut control system sharing and communicating its sensor data, such as its processed accelerometer information, with each other through the electrical communication connection 78 link to control roll of the cab body. In preferred embodiments the controllable magnetorheological fluid damper struts 30 are self controlled and autonomous with each having its own circuit board control system 72 housed in its upper strut end head member 66, with the struts control system sharing its sensor data through its electrical communication connection 78 to control a motion of the cab relative to the frame, such as to control roll, or with a four point strut suspension controlling roll and pitch of the cab with the four self controlled sensor data sharing struts 30. In a preferred embodiment at least three struts 30 provide for a three point cab suspension system for control of roll and pitch, preferably with three independent self-controlled struts 30, 30, and 30' and one dependent strut 30".

In an embodiment the invention includes a controllable damper for controlling motion. The controllable damper 32 provides for the controlling or relative motion between a first body 22 and a second body 24, preferably with the damper controlling motion in a vehicle, most preferably in a suspension system 20 between a vehicle frame and the vehicles cab. In alternative embodiments the damper 32 provides for controlling motion in non-vehicle stationary suspensions. The controllable damper 32 includes a longitudinal damper tubular housing 34 having a longitudinally extending axis 36. The longitudinal damper tubular housing 34 has an inner wall 38 for containing a magnetorheological fluid 40 within the tubular housing, with the damper housing having an upper damper end 60 and a lower damper end 58. The controllable damper 32 includes a cantilevered single ended damper piston 42. The damper piston 42 includes a piston head 44 movable within the damper tubular housing 34 along a longitudinal stroke length of the tubular housing, with the damper piston head 44 providing a first upper variable volume magnetorheological fluid chamber 46 and a second lower variable volume magnetorheological fluid chamber 48. The damper piston head 44 has a fluid flow gap 50 between the first upper variable volume magnetorheological fluid chamber 46 and the second lower variable volume magnetorheological fluid chamber 48 with a piston head fluid flow interface length HL, preferably with the gap 50 having a width Pgap between the piston head OD and inner surface ID of the tubular housing 34. The damper piston 42 has a longitudinal piston rod 52 for supporting the piston head 44 within the longitudinal damper tubular housing 34. Preferably the cantilevered piston rod 52 is the only mechanical support for supporting the piston head within the damper housing with a bearing. The piston 42 is supported within the longitudinal damper tubular housing with an upper piston rod bearing assembly 54 disposed between the longitudinal damper tubular housing 34 and the longitudinal piston rod 52. The piston rod bearing assembly 54 having a piston rod bearing seal interface length BL, wherein contact between the piston head 44 and the damper tubular housing inner wall 38 is inhibited. Preferably the piston head 44 is a wearbandfree piston head, with the magnetorheological fluid flow gap width Pgap maintained between piston head OD sides and tubular housing inner wall with no wear band or seal on the piston head or between the piston OD sides and the inner wall. Preferably the damper 32 minimizes off state resistance a minimized parasitic drag and resistance. Preferably the off state energy dissipation of damper 32 when no controlling current is supplied to the piston head EM coil 94 is minimized by inhibiting contact between the piston head and housing wall while maintaining the predetermined magnetorheological fluid flow gap cylindrical shell of length HL and thickness Pgap. Preferably the piston 42 has a constant bearing length BL in that the piston head 44 has no bearing contact with the housing inner wall 38. Preferably the damper 32 is a single ended damper as compared to a double ended damper, preferably with the rod 52 terminating with the piston head 44, with the piston head otherwise unconnected to the housing and the lower housing end 58 distal from the piston rod bearing 54, preferably with the only mechanical connection of the piston head 44 with the single piston rod extending to the upper bearing assembly, with the rod terminating in the piston head. Preferably the piston head 44 is free of internal fluid flow conduits inside the piston head OD, preferably with substantially all fluid flow of the magnetorheological fluid 40 between the piston head and the housing through the magnetorheological fluid flow gap 50. Preferably the controllable damper 32 cantilevered piston length BL is greater than the piston head cylindrical shell gap length HL.

Preferably the controllable magnetorheological fluid damper 32 includes an upper damper volume compensator 62. The volume compensator 62 is proximate the piston rod bearing assembly 54. Preferably the gas compliance volume compensator 62 is adjacent the upper piston rod bearing 54, preferably with the bearing holder support structure 55 and the volume compensator housing cavity 82 integrated into an upper bearing gas charged compliance member. Preferably the gas compliance volume compensator 62 is in fluid communication with the first upper variable volume magnetorheological fluid chamber 46, with the volume compensator proximate the upper bearing and the piston rod, preferably with upper fluid chamber 46 and volume compensator 62 in use oriented on top of lower fluid chamber 48 relative to the force of gravity to allow gas bubble migration upward into volume compensator 62. Preferably the damper 32 provides for a dry assembly process with magnetorheological fluid filled after the piston 42 is assembled in the housing 34, preferably through a lower housing end opening 59, then gas pressure charging of the gas compliance volume compensator 62 through an upper end conduit 90. Preferably the piston rod bearing assembly bearing holder support structure 55 includes fluid flow conduits 92 to allow flow of fluid into and out of the volume compensator, preferably with conduits 92 providing for greater flow than the magnetorheological piston head gap 50, preferably with relatively high flow into and out of the volume compensator as compared to piston head flow, with relatively low resistance to flow into volume compensator.

Preferably the controllable magnetorheological fluid damper 32 includes an upper strut end head member 66 with an electrical power input 68. Preferably the upper strut end head member houses the damper control system 72 with electronic control circuit board 74. In a preferred embodiment the power input is included with a multiple wire array connector 78, such as a CAN bus electrical connector 78, preferably with the multiple wire electrical connection providing for receiving outside the strut damper control signals in addition to electrical power input that generates the magnetorheological fluid controllable magnetic field. Preferably the upper strut end head member houses the damper control sensor system, preferably including the upper head end of the magneto-strictive longitudinal sensor 80 that is aligned axis 36 and housed within the piston rod 52. Preferably the upper strut end head member housing includes the control system for also controlling leveling with the gas spring with a leveling valve 76 for controlling pneumatic leveling of the strut 30. Preferably the strut and damper with the upper strut end head member 66 is an intelligent self-contained damper system with the head member containing the electronics control system circuit boards 74 that receives sensor inputs such as from the magnetostrictive sensor 80 and accelerometers 120, and controls the electrical current supplied to the piston head EM coil 94 through the current supply wire circuit 100 to control the damper 32, preferably with the control electronics including accelerometer sensors 120, preferably an at least one accelerometer axis acceleration sensed, preferably with a first accelerometer axis 122 aligned with the damper axis 36. Preferably the accelerometer sensor 120 is an at least two axis accelerometer, and most preferably a three axis accelerometer, with the first axis 122 aligned with the damper axis 36, the second and third axis normal to the damper axis 36.

Preferably the controllable magnetorheological fluid damper upper piston rod bearing assembly 54 includes a bearing holder support structure 55 which receives a first upper bearing 56, a distal second lower bearing 56, and a piston rod seal 53 to provide the piston rod bearing seal interface length BL. Preferably the controllable magnetorheological fluid damper upper piston rod bearing assembly 54 includes bearing holder 55 which receives at least first bearing 56 and a compliance member cavity 82 for receiving a volume compensator gas compliance member 84. Preferably the controllable magnetorheological fluid damper upper piston rod bearing assembly 54 includes bearing holder 55 which receives at least first bearing 56 and a sensor target magnet holder 86 which receives a target magnet 88 for producing a sensor signal in the proximate magnetostrictive sensor 80 in the non-magnetic piston rod 52, to provide a sensed measurement of the location of the target magnet along the length of sensor 80 to provide a measurement of the stroke position of the piston head in the damper housing that is used as an input into the damper electronic control system.

Preferably the controllable magnetorheological fluid damper piston head 42 includes an insulating encapsulant injected pressurized polymer overmolded electromagnetic coil 94, with the piston head, overmolded electromagnetic coil and magnetic poles ODs sized to provide the predetermined gap Pgap with the housing inner wall ID, with the gap 50 maintained to inhibit contact with the wall 38 and to provide the fluid flow gap 50 with the coil 94 producing a magnetic field for controlling magnetorheological fluid flow through the gap. The controllable piston head electromagnetic coil 94, upper and lower magnetic poles 96 with a variable applied current producing a controlling magnetic field for controlling the flow of magnetorheological fluid 40 between the upper and lower chambers 46 and 48, with the electromagnetic coil 94 comprised of an electrically insulated injected pressurized polymer overmolded electromagnetic magnetorheological fluid coil 94. The preferred modular component injected pressurized polymer overmolded electromagnetic magnetorheological fluid coil 94 is shown in FIGS. 7A-I. Preferably the EM coil insulated wire 102 is wound on the non-magnetic plastic bobbin 104, with the coiled wire 102 on the bobbin 104 pressure overmolded with the injected pressurized polymer 110 in the pressurized injection overmold 106 under an applied pressure 107. Preferably the pressurized injection overmolded EM coil 94 includes first and second wire pins 108 for connection with a current supply wire circuit 100 that supplies the controlling current output by the control system. Preferably the modular component pressurized injection overmolded EM coil 94 is sandwiched between the upper and lower magnetic metal poles 96, to provide the current controllable EM coil piston head 44, with the modular component pressurized injection overmolded EM coil 94 overmolded EM coil and poles 96 sized to provide the predetermined gap 50 with the housing inner wall 38, with the pressurized injection overmolded EM coil magnetic field controlling magnetorheological fluid flow proximate the piston head EM coil.

In an embodiment the invention includes a method of making a controllable suspension system for controlling the relative motion between a first body and a second body. Preferably the invention provides a method of making a controllable vehicle suspension system for controlling the relative motion between a first vehicle body and a second vehicle body, most preferably a method of making a vehicle cab suspensions for controlling the motion between a first body cab 22 and a second body frame 24. The method includes providing the longitudinal damper tubular housing having a longitudinally extending axis, the longitudinal damper tubular housing 34 having inner wall 38 for containing a magnetorheological fluid within the tubular housing. The provided longitudinal damper tubular housing 34 has a first upper end 60 and a second distal lower end 58, with the housing centered about axis 36. The method includes providing piston rod bearing assembly 54 having piston rod bearing seal interface length BL for supporting damper piston 42 within the longitudinal damper tubular housing 34. The method includes providing cantilevered damper piston 42 including piston head 44 and longitudinal piston rod 52. Cantilever piston rod 52 supports the piston head 44 within the longitudinal damper tubular housing, with the upper piston rod bearing assembly 54 disposed between the longitudinal damper tubular housing and the longitudinal piston rod. The method includes disposing the piston rod bearing assembly 54 in the longitudinal damper tubular housing 34 proximate the first upper end 60. The method includes receiving the damper piston longitudinal piston rod 53 in the piston rod bearing assembly 54, wherein the piston head 44 is movable within the damper tubular housing along the longitudinal length of the tubular housing, with the damper piston head providing a first upper variable volume magnetorheological fluid chamber 46 and a second lower variable volume magnetorheological fluid chamber 48, the damper piston head having a fluid flow gap 50 between the first upper variable volume magnetorheological fluid chamber and the second lower variable volume magnetorheological fluid chamber with a piston head fluid flow interface length HL with contact between the piston head and the damper tubular housing inner wall inhibited. The method includes providing magnetorheological damper fluid 40 and disposing the magnetorheological damper fluid 40 in the damper tubular housing 34. The damper provides for controlling the relative motion between the first body 22 and the second body 24. Preferably the method includes providing the longitudinal air strut gas spring 64, and aligning the longitudinal strut gas spring with the longitudinal damper tubular housing longitudinally extending axis 36 with the strut air spring and magnetorheological damper aligned and packaged together with the gas spring encompassing the magnetorheological damper, preferably with the upper end 60 and the piston rod 52 substantially housed within the gas spring 64, preferably with the upper end of strut including the upper strut end head member 66 for attachment to the uppermost first or second body. Preferably the upper strut end head member 66 includes the electrical power input and the compressed air gas input, along with the strut control system with electronic control circuit boards 74, gas spring air sleeve leveling valve 76. In preferred embodiments the upper strut end head member 66 includes the CAN-Bus electrical connection for receiving outside the strut control signals in addition to electrical power input into the strut. In preferred embodiments the upper strut end head member 66 includes the damper sensor system with the end of magneto-strictive longitudinal sensor 80 that is aligned and housed within the piston rod. Preferably the piston rod bearing assembly 54 is provided with the piston rod bearing seal interface length BL greater than the HL. Preferably the upper volume compensator 62 is provided and disposed proximate the piston rod bearing assembly 54. Preferably the upper piston rod bearing assembly includes the bearing holder which receives the first upper bearing and the distal second lower bearing to provide the piston rod bearing seal interface length BL. Preferably the upper piston rod bearing assembly includes the bearing holder which receives the at least first bearing and includes the compliance member cavity for receiving the volume compensator gas compliance member. Preferably the upper piston rod bearing assembly includes the bearing holder which receives the at least first bearing and has the sensor target magnet holder which receives the target magnet for the magnetostrictive sensor in the non-magnetic piston rod. Preferably the magnetorheological fluid damper includes the upper volume compensator, with the volume compensator proximate the piston rod bearing. Preferably at least a first cantilevered magnetorheological fluid damper, and at least a second cantilevered magnetorheological fluid damper are disposed between the first body and the second body. Preferably the at least a third cantilevered magnetorheological fluid damper is disposed between the first body and the second body.

Preferably the invention includes the method of making the controllable damper for controlling motion. Preferably the method includes providing the longitudinal damper tubular housing having the longitudinally extending axis, the longitudinal damper tubular housing having the inner wall for containing the magnetorheological fluid within the tubular housing, the longitudinal damper tubular housing having the first upper end and the second distal lower end. The method includes providing the piston rod bearing assembly, the piston rod bearing assembly having the piston rod bearing seal interface length BL for supporting the damper piston within the longitudinal damper tubular housing. The method includes providing the cantilevered damper piston, the damper piston including the piston head and the longitudinal piston rod for supporting the piston head within the longitudinal damper tubular housing. The method includes disposing the piston rod bearing assembly in the longitudinal damper tubular housing proximate the first upper end. The method includes receiving the damper piston longitudinal piston rod in the piston rod bearing assembly, wherein the piston head is movable within the damper tubular housing along the longitudinal length of the tubular housing, with the damper piston head providing the first upper variable volume magnetorheological fluid chamber and the second lower variable volume magnetorheological fluid chamber, the damper piston head having the fluid flow gap between the first upper variable volume magnetorheological fluid chamber and the second lower variable volume magnetorheological fluid chamber with the piston head fluid flow interface length HL, with HL<BL and contact between the piston head and the damper tubular housing inner wall inhibited. Preferably the method includes providing the upper volume compensator, and disposing the volume compensator proximate the piston rod bearing assembly. Preferably the method includes providing the upper strut end head member with the electrical power input and disposing the strut end head member proximate the damper tubular housing first end. Preferably the method includes providing the upper piston rod bearing assembly with the bearing holder support structure which receives the first upper bearing and the distal second lower bearing to provide the piston rod bearing seal interface length BL. Preferably the method includes providing the upper piston rod bearing assembly with the bearing holder support structure which receives at least the first bearing and includes the compliance member cavity for receiving the volume compensator gas compliance member. Preferably the method includes providing the upper piston rod bearing assembly with the bearing holder support structure which receives at least the first bearing and includes the sensor target magnet holder which receives the target magnet. Preferably the method includes providing the piston head with the injected pressurized polymer overmolded electromagnetic coil.

In an embodiment the invention includes a method of making a controllable damper for controlling motion. The method includes providing a longitudinal damper tubular housing 34 having a longitudinally extending axis 36. The provided longitudinal damper tubular housing 34 having an inner wall 38 for containing a magnetorheological fluid 40 within the tubular housing. The longitudinal damper tubular housing 34 has a first upper end 60 and a second distal lower end 58. The method includes providing a piston rod bearing assembly 54, the piston rod bearing assembly having a piston rod bearing seal interface length BL for supporting a damper piston 42 within the longitudinal damper tubular housing 34. The method includes providing a damper piston 42, the damper piston including a magnetorheological fluid piston head 44 and a longitudinal piston rod 52 for supporting the piston head within the longitudinal damper tubular housing 34. The magnetorheological fluid piston head 44 includes an insulating injected pressurized polymer overmolded electromagnetic magnetorheological fluid coil 94. The controllable magnetorheological fluid damper piston insulating encapsulant injected pressurized polymer overmolded electromagnetic coil 94 and magnetic poles 96 preferably having ODs sized to provide the predetermined gap 50 Pgap with the housing inner wall ID, with the gap 50 maintained to inhibit contact with the wall 38 and to provide the fluid flow gap 50 with the coil 94 producing a magnetic field for controlling magnetorheological fluid flow through the gap. The controllable piston head electromagnetic coil 94, upper and lower magnetic poles 96 with a variable applied current producing a controlling magnetic field for controlling the flow of magnetorheological fluid 40 between the upper and lower chambers 46 and 48, with the electromagnetic coil 94 comprised of the modular component electrically insulated injected pressurized polymer overmolded electromagnetic magnetorheological fluid coil 94. The preferred modular component injected pressurized polymer overmolded electromagnetic magnetorheological fluid coil 94 is shown in FIGS. 7A-I. Preferably the EM coil insulated wire 102 is wound on the non-magnetic plastic polymer bobbin 104, with the coiled wire 102 on the bobbin 104 pressure overmolded with the injected pressurized polymer 110 in the pressurized injection overmold 106 under an applied pressure 107. Preferably the non-magnetic plastic polymer bobbin 104 and the injected pressurized polymer 110 are comprised of substantially the same base polymer, in a preferred embodiment the bobbin 104 and the pressurized injection overmold polymer 110 are comprised of nylon. In a preferred embodiment the bobbin 104 is comprised of a glass filled nylon and the pressurized injection overmold polymer 110 is comprised of a nylon, preferably a non-glass-filled nylon. In a preferred embodiment the bobbin 104 and the overmold polymer 110 are comprised of a common polymer, preferably with the common polymer comprised of a nylon. Preferably the pressurized injection overmolded EM coil 94 includes first and second wire pins 108 for connection with a current supply wire circuit 100 that supplies the controlling current outputted by the damper control system. Preferably the modular component pressurized injection overmolded EM coil 94 is sandwiched between the upper and lower magnetic metal poles 96, to provide the current controllable EM coil piston head 44. The modular component pressurized injection overmolded EM coil 94 overmolded EM coil and poles 96 provide a magnetic field for controlling magnetorheological fluid flow proximate the piston head EM coil. The method includes disposing the piston rod bearing assembly 54 in the longitudinal damper tubular housing 34 proximate the first upper end 60. The method includes receiving the damper piston longitudinal piston rod 52 in the piston rod bearing assembly 54, wherein the magnetorheological fluid piston head 44 is movable within the damper tubular housing along the longitudinal stroke length of the tubular housing and the axis 36, with the damper piston head 44 providing first upper variable volume magnetorheological fluid chamber 46, second lower variable volume magnetorheological fluid chamber 48, and the fluid flow gap between the first upper variable volume magnetorheological fluid chamber and the second lower variable volume magnetorheological fluid chamber. The method includes providing a magnetorheological damper fluid 40 and disposing the magnetorheological damper fluid 40 in the damper tubular housing 34 wherein a current supplied to the injected pressurized polymer overmolded electromagnetic magnetorheological fluid coil 94 controls the flow of the magnetorheological damper fluid 40 proximate the injected pressurized polymer overmolded electromagnetic magnetorheological fluid coil 94. The method includes injection molding a polymer 110 with a positive pressure into a overmold 106 containing the wire wrapped electromagnetic coil nonmagnetic plastic bobbin 104 to provide the plastic modular injected pressurized polymer overmolded electromagnetic magnetorheological fluid coil 94 for assembly into the piston head 44. Preferably the EM coil insulated wire 102 is wound on a non-magnetic plastic bobbin 104 with the coiled wire and bobbin pressure overmolded with an injected pressurized polymer 110 in a predetermined sized cavity overmold 106 under pressure. Preferably the overmolded EM coil 94 includes first and second wire pins 108 for connection with a current supply circuit 100. Preferably the modular component EM coil 94 is sized and shaped to be sandwiched between upper and lower magnetic metal poles 96. Preferably the wire 102 is wound on non-magnetic plastic bobbin 104, and then placed in coil overmold 106, with insulating injected pressurized polymer nylon polymer 110 overmolded around the bobbin and wire. Preferably the piston head 44 and its overmolded EM coil 94 and poles 96 are sized to provide predetermined gap 50 with the housing inner wall 38, with the EM coil magnetic field controlling fluid flow 40 proximate the piston head EM coil 94. Preferably the damper overmolded EM coil 94 in damper 32 provides for controlling the relative motion between first body 22 and the second body 24, preferably with the damper 32 providing a controllable strut 30. Preferably the damper overmolded EM coil 94 is utilized in the making of single ended dampers 32 as compared to double ended dampers, preferably with the rod 52 terminating with the piston head 44 that contains the coil 94. Preferably the piston head 44 is free of internal fluid flow conduits, preferably substantially all fluid flow is between piston head and housing through the magnetorheological fluid flow gap proximate the EM coil OD, preferably with the piston 42 having a constant bearing length with the piston head 44 having no bearing contact with the housing inner wall 38. In alternative preferred embodiments the piston head 44 has a wear band and contact with the housing wall 38. Preferably the method includes providing upper volume compensator 62, and disposing the volume compensator 62 proximate the piston rod bearing assembly 54. Preferably the volume compensator 62 is adjacent the upper piston rod bearing 54, preferably with the bearing holder support structure and volume compensator housing integrated into an upper bearing gas charged compliance member. Preferably the gas compliance volume compensator 62 is in fluid communication with the first upper variable volume magnetorheological fluid chamber 46, with the volume compensator proximate the upper bearing 56 and the piston rod 52, preferably with the upper fluid chamber 46 and volume compensator 62 in use oriented on the top end of the damper relative to the force of gravity. Preferably the damper components provide for dry assembly of the damper piston in the housing with magnetorheological fluid 40 disposed into the damper after the piston is assembled into the housing, and then gas pressure charging of gas compliance volume compensator 62. Preferably the piston rod bearing assembly bearing holder support structure 55 includes fluid flow conduits 92 to allow flow of fluid 40 into and out of the volume compensator 62, preferably with the conduits providing for greater flow than the magnetorheological piston head gap 50. Preferably the method includes providing upper strut end head member 66 with an electrical power input 68 and disposing the strut end head member 66 proximate the damper tubular housing first end 60, with the head member providing the controlling current to the EM coil 94 through circuit 100. Preferably the strut end head member 66 includes the control system 72 with electronic control circuit boards 74, preferably also including CAN-Bus electrical connection 78 for receiving outside the strut control signals in addition to electrical power input 68. Preferably the head member 66 includes a damper sensor system, preferably with the end of the magneto-strictive longitudinal sensor 80 that is aligned and housed within the piston rod 52. Preferably the upper strut end head member housing 66 includes the control system of the magnetorheological damper 32 and the gas spring 64 for controlling pneumatic leveling of the strut. Preferably the damper is an intelligent self-contained damper system with the head member 66 containing the electronics control system that receives sensor inputs and control the electrical current supplied to the EM coil in the piston head to control the damper, preferably with control electronics including accelerometer sensors 120, preferably with a 2-axis alignment oriented with the axis 36. Preferably the upper strut end head member housing cavity 66 houses the electronic control sensor system circuit board or boards 74, preferably with the circuit board plane in alignment with the damper longitudinal axis 36 so the circuit board 74 is substantially vertically oriented in use with a lower end and an upper end, with the circuit board having a first accelerometer 120 and a second accelerometer 120 normal to the first, preferably with first accelerometer sensing axis 122 in alignment with the damper longitudinal axis 36 and the second accelerometer sensing axis 122 oriented perpendicular thereto. Preferably the provided upper piston rod bearing assembly 54 includes bearing holder support structure 55 which receives first upper bearing 56 and distal second lower bearing 56 to provide the piston rod bearing seal interface length BL. Preferably the upper piston rod bearing assembly 54 includes a bearing holder support structure 55 which receives at least a first bearing 56 and includes a compliance member cavity 82 for a volume compensator gas compliance member 84. Preferably the upper piston rod bearing assembly 54 includes a bearing holder support structure 55 which receives at least a first bearing 56 and includes a sensor target magnet holder 86 which receives a target magnet 88 for the magnetostrictive sensor 80 in the non-magnetic piston rod 52. Preferably the damper is dry assembled, then filled with magnetorheological fluid 40, then closed and sealed, preferably through the second lower end 58, preferably with a lower end stopper member which closes off and seal the damper and provides a lower end attachment member for attaching to the lower moving body 22,24. Preferably the piston rod 52 is hollow with an inner longitudinal chamber which includes a longitudinal magnetostrictive sensor 80, preferably with the piston rod nonmagnetic such that the permanent magnet target 88 produces a magnetic field sensed along the length of the sensor 80 and detected by the sensor head end preferably in the upper strut end head member 66. Preferably the piston rod inner longitudinal chamber includes the current supply connection circuit 100, preferably insulated wires providing connections from the current source in upper strut end head member down through rod and connected to the overmolded EM coil pins 108. Preferably the lower end of the piston rod inner longitudinal chamber is sealed off, preferably with a sealing member 98 between the lower rod end and piston head, preferably integrated with the rod and piston head attachment joint. Preferably the overmolded EM coil 94 includes an inner overmolded core receiving chamber 112, overmolded to receive a ferromagnetic core member 114, preferably with the magnetic metal core member 114 that is received in the inner overmolded core receiving chamber including an extending pole member 116 that extends out of the receiving chamber 112, preferably having an OD substantially matching the OD of the overmolded coil and the OD of the piston head, with the extending pole member 116 providing the upper magnetic pole member 96 of the piston head 44. Preferably the OD of the piston head and the overmolded coil are sized to provide the piston gap Pgap between the OD and the damper tubular housing inner wall ID. Preferably the overmolded coil includes the coil guides 95, preferably with the guides extending longitudinally along the axis 36 such that they extend over the magnetic pole members 96, with the guides 95 extending radially outward from the OD into the piston gap Pgap towards the damper tubular housing inner wall ID.

Preferably the received core member 114 includes an inner core center chamber 118 centered inside the core and extending pole member OD, the inner core center chamber 118 receiving the lower piston rod end and preferably the overmolded coil wire pin connectors 108, preferably with the sealing member 98 between the lower rod end and overmolded coil 94, preferably with the inner core center chamber and the lower piston rod end having mating attachment means, preferably such as matching threads for attaching the piston rod 52 with the piston head 44. Preferably the overmolded EM coil 94 includes a longitudinal center axis hub member 124 with the EM coil wire pins 108 and a radially extending wire coil connecting arm structure spokes 126 which provides a containment structure for the coil connection wire leads leading from the longitudinal extending wire pins 108 radially outward to the wound coil on the bobbin, and the received core member 114 includes lower end arm receiving radially extending channels 115 for receiving the extending wire coil connecting arms structure 126 including the overmold encapsulated radially extending wire leads. Preferably the overmolded coil includes the coil guides 95 centered around the axis 36 and extending longitudinally along the axis 36 such that they extend partially over an adjacent part of the magnetic pole members 96 proximate the overmolded coil, with the guides 95 extending radially outward from the OD into the piston gap Pgap towards the damper tubular housing inner wall ID, with the guide radial height from the OD sized to the piston gap dimension Pgap.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

We claim:

1. A method of making a controllable damper for controlling motion, said method comprises:

providing a longitudinal damper tubular housing having a longitudinally extending axis, said longitudinal damper tubular housing having an inner wall with a housing inner wall ID for containing a magnetorheological fluid within said tubular housing, said longitudinal damper tubular housing having a first upper end and a second distal lower end, providing a piston rod bearing assembly, said piston rod bearing assembly having a piston rod bearing seal interface length BL for supporting a damper piston within said longitudinal damper tubular housing, providing a wire wrapped electromagnetic coil nonmagnetic bobbin, overmolding said wire wrapped electromagnetic coil nonmagnetic bobbin with a pressurized polymer to provide a plastic modular injected pressurized polymer overmolded electromagnetic magnetorheological fluid coil with an overmolded electromagnetic coil OD and an inner overmolded core receiving chamber for receiving a magnetic core member, providing a magnetic core member, said magnetic core member including an extending pole member, said extending pole member having an extending pole member OD, providing a second pole member, said second pole member having a second pole member OD, providing a longitudinal piston rod, receiving said magnetic core member in said plastic modular injected pressurized polymer overmolded electromagnetic magnetorheological fluid coil inner overmolded core receiving chamber, assembling said second pole member, said magnetic core member received in said plastic modular injected pressurized polymer overmolded electromagnetic magnetorheological fluid coil, and said longitudinal piston rod to provide a damper piston with a magnetorheological fluid piston head having a magnetorheological fluid piston head OD, disposing said piston rod bearing assembly in said longitudinal damper tubular housing proximate said first end, receiving said damper piston longitudinal piston rod in said piston rod bearing assembly, wherein said magnetorheological fluid piston head is movable within the damper tubular housing along said longitudinally extending axis, with said damper piston head providing a first upper variable volume magnetorheological fluid chamber and a second lower variable volume magnetorheological fluid chamber, said damper piston head providing a fluid flow gap between the first upper variable volume magnetorheological fluid chamber and the second lower variable volume magnetorheological fluid chamber with said fluid flow gap comprised of a piston gap Pgap between said magnetorheological fluid piston head OD and said housing inner wall ID, providing a magnetorheological damper fluid and disposing said magnetorheological damper fluid in said damper tubular housing wherein a current supplied to said overmolded electromagnetic magnetorheological fluid coil controls the flow of said magnetorheological damper fluid proximate said overmolded electromagnetic magnetorheological fluid coil in said piston gap Pgap between said magnetorheological fluid piston head OD and said housing inner wall ID.

2. A method as claimed in claim 1 said method includes providing a volume compensator, and disposing said volume compensator proximate said piston rod bearing assembly.

3. A method as claimed in claim 1 said method includes providing an upper strut end head member with an electrical power input and disposing said strut end head member proximate said damper tubular housing first end.

4. A method as claimed in claim 1, wherein providing said piston rod bearing assembly includes providing a bearing holder which receives a first upper bearing and a distal second lower bearing to provide said piston rod bearing seal interface length BL.

5. A method as claimed in claim 1, wherein providing said piston rod bearing assembly includes providing a bearing holder which receives at least a first bearing and includes a compliance member cavity for receiving a volume compensator gas compliance member.

6. A method as claimed in claim 1, wherein providing said piston rod bearing assembly includes providing a bearing holder which receives at least a first bearing and includes a sensor target magnet holder which receives a target magnet.

7. A method as claimed in claim 1, wherein said overmolded electromagnetic magnetorheological fluid coil includes a plurality of guides.

8. A method of making a controllable damper for controlling motion, said method comprises:

providing a longitudinal damper tubular housing having a longitudinally extending axis, said longitudinal damper tubular housing having an inner wall with a housing inner wall ID for containing a magnetorheological fluid within said tubular housing, said longitudinal damper tubular housing having a first upper end and a second distal lower end, providing a piston rod bearing assembly, said piston rod bearing assembly having a piston rod bearing seal interface for supporting a damper piston within said longitudinal damper tubular housing, providing a wrapped electromagnetic coil nonmagnetic bobbin, overmolding said wrapped electromagnetic coil nonmagnetic bobbin with a pressurized polymer to provide a plastic modular injected pressurized polymer overmolded electromagnetic magnetorheological fluid coil with an overmolded electromagnetic coil OD and an inner overmolded core receiving chamber for receiving a magnetic core member, with said plastic modular injected pressurized polymer overmolded electromagnetic magnetorheological fluid coil including a plurality of molded polymer coil guides, providing a magnetic core member, said magnetic core member including an extending first upper magnetic pole member, said extending first upper magnetic pole member having an extending first upper magnetic pole member OD, providing a second lower magnetic pole member, said second lower magnetic pole member having a second pole member OD, providing a longitudinal piston rod, receiving said magnetic core member in said plastic modular injected pressurized polymer overmolded electromagnetic magnetorheological fluid coil inner overmolded core receiving chamber, assembling said second lower magnetic pole member, said magnetic core member received in said plastic modular injected pressurized polymer overmolded electromagnetic magnetorheological fluid coil, and said longitudinal piston rod to provide a damper piston with a magnetorheological fluid piston head having a magnetorheological fluid piston head OD with said overmolded electromagnetic magnetorheological fluid coil between said extending first upper magnetic pole member and said second lower magnetic pole member, and said longitudinal piston rod for supporting said magnetorheological fluid piston head, disposing said piston rod bearing assembly in said longitudinal damper tubular housing proximate said first end, receiving said damper piston longitudinal piston rod in said piston rod bearing assembly, wherein said magnetorheological fluid piston head is movable within the damper tubular housing along the longitudinally extending axis of said tubular housing, with said damper piston head providing a first upper variable volume magnetorheological fluid chamber and a second lower variable volume magnetorheological fluid chamber, said damper piston head providing a fluid flow gap between the first upper variable volume magnetorheological fluid chamber and the second lower variable volume magnetorheological fluid chamber, with said fluid flow gap comprised of a piston gap Pgap between said magnetorheological fluid piston head OD and said housing inner wall ID, providing a magnetorheological damper fluid and disposing said magnetorheological damper fluid in said damper tubular housing wherein a current supplied to said overmolded electromagnetic magnetorheological fluid coil controls the flow of said magnetorheological damper fluid proximate said overmolded electromagnetic magnetorheological fluid coil in said piston gap Pgap between said magnetorheological fluid piston head OD and said housing inner wall ID.

9. A method as claimed in claim 8 wherein said piston rod has a lower piston rod end, with said plastic modular injected pressurized polymer overmolded electromagnetic magnetorheological fluid coil having an inner core center chamber with said lower piston rod end received in said inner core center chamber.

10. A method as claimed in claim 8 wherein said molded polymer coil guides are longitudinally extending coil guides.

11. A method as claimed in claim 10 wherein said longitudinally extending coil guides are aligned and centered with said longitudinally extending axis.

12. A method as claimed in claim 11 wherein said longitudinally extending coil guides extend over said first upper magnetic pole and said second lower magnetic pole.

13. A method of making a controllable damper for controlling motion, said method comprises:

providing a longitudinal damper tubular housing having a longitudinally extending axis, said longitudinal damper tubular housing having an inner wall with a damper tubular housing inner wall ID for containing a magnetorheological fluid within said tubular housing, said longitudinal damper tubular housing having a first upper end and a second distal lower end, providing a piston rod bearing assembly, said piston rod bearing assembly having a piston rod bearing seal interface for supporting a longitudinal piston rod, providing a pressure overmolded electromagnetic magnetorheological fluid coil, said overmolded electromagnetic magnetorheological fluid coil comprised of an electrical conductor insulated wire coil overmolded with a nonmagnetic polymer and having an inner overmolded core receiving chamber for receiving a magnetic core member, providing a magnetic core member comprised of a magnetic material, said magnetic core member including an extending first upper magnetic pole, providing a second lower magnetic pole comprised of a magnetic material, assembling said pressure overmolded electromagnetic magnetorheological fluid coil, said magnetic core member, and said second lower magnetic pole, with said magnetic core member received in said inner overmolded core receiving chamber with said pressure overmolded electromagnetic magnetorheological fluid coil between said extending first upper magnetic pole and said second lower magnetic pole to provide a damper piston with a damper piston head assembly OD on said longitudinal piston rod, disposing said piston rod bearing assembly in said longitudinal damper tubular housing proximate said first end, receiving said damper piston longitudinal piston rod in said piston rod bearing assembly, wherein said magnetorheological fluid piston head is movable within the damper tubular housing along said axis, with said damper piston head providing a first upper variable volume magnetorheological fluid chamber and a second lower variable volume magnetorheological fluid chamber, said damper piston head providing a fluid flow gap between the first upper variable volume magnetorheological fluid chamber and the second lower variable volume magnetorheological fluid chamber, with said fluid flow gap comprised of a piston gap Pgap between said damper piston head assembly OD and said housing inner wall ID, providing a magnetorheological damper fluid and disposing said magnetorheological damper fluid in said damper tubular housing wherein a current supplied to said overmolded electromagnetic magnetorheological fluid coil controls the flow of said magnetorheological damper fluid in said piston gap Pgap between said damper piston head assembly OD and said housing inner wall ID proximate said magnetorheological fluid piston head assembly.

14. A method as claimed in claim 13, wherein said pressure overmolded electromagnetic magnetorheological fluid coil includes a plurality of guides.

15. A method as claimed in claim 13, wherein said pressure overmolded electromagnetic magnetorheological fluid coil includes said electrical conductor insulated wire coil overmolded with said nonmagnetic polymer with said nonmagnetic polymer including molded polymer coil guides.

16. A method as claimed in claim 15 wherein said electrical conductor insulated wire coil is coiled on a nonmagnetic plastic bobbin.

17. A method as claimed in claim 15 wherein said molded polymer coil guides are longitudinally extending coil guides.

18. A method as claimed in claim 17 wherein said longitudinally extending coil guides are aligned and centered with said longitudinally extending axis.

19. A method as claimed in claim 18 wherein said longitudinally extending coil guides extend over said first upper magnetic pole and said second lower magnetic pole.

20. A method as claimed in claim 14 wherein said electrical conductor insulated wire coil is coiled on a nonmagnetic plastic bobbin.

21. A method as claimed in claim 20 wherein said pressure overmolded electromagnetic magnetorheological fluid coil includes a plurality of longitudinally extending coil guides.

* * * * *